(12) United States Patent
Theimer et al.

(10) Patent No.: US 10,986,013 B1
(45) Date of Patent: Apr. 20, 2021

(54) FAULT INJECTION SERVICE

(71) Applicant: Amazon Technologies, Inc., Seattle, WA (US)

(72) Inventors: Marvin Michael Theimer, Seattle, WA (US); Joshua M. Burgin, Seattle, WA (US); Rebecca Claire Weiss, Vienna, VA (US); Brad Eugene Marshall, Bainbridge Island, WA (US); Allan Henry Vermeulen, Corvallis, OR (US); Peter Sven Vosshall, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/584,848

(22) Filed: Sep. 26, 2019

(51) Int. Cl.
*G06F 11/26* (2006.01)
*H04L 12/26* (2006.01)
*G06F 11/36* (2006.01)
*H04L 12/24* (2006.01)

(52) U.S. Cl.
CPC .......... *H04L 43/50* (2013.01); *G06F 11/3644* (2013.01); *G06F 11/3664* (2013.01); *G06F 11/3688* (2013.01); *H04L 41/5038* (2013.01); *H04L 43/12* (2013.01); *H04L 43/14* (2013.01)

(58) Field of Classification Search
CPC ......... H04L 43/50; H04L 43/12; H04L 43/14; H04L 41/5038; G06F 11/3664; G06F 11/3644; G06F 11/3688
See application file for complete search history.

(56) References Cited

U.S. PATENT DOCUMENTS

| | | |
|---|---|---|
| 6,216,237 B1 | 4/2001 | Klemm et al. |
| 6,477,666 B1 | 11/2002 | Sanchez et al. |
| 6,484,276 B1 | 11/2002 | Singh et al. |
| 6,701,460 B1 | 3/2004 | Suwandi et al. |
| 7,185,232 B1 | 2/2007 | Leavy et al. |
| 7,467,333 B2 | 12/2008 | Keeton et al. |
| 2016/0011952 A1* | 1/2016 | Tejerina ............. G06F 11/3672 714/41 |
| 2017/0024299 A1* | 1/2017 | Deng .................. G06F 11/263 |
| 2018/0203963 A1* | 7/2018 | Eghbal ................ G06F 11/261 |

OTHER PUBLICATIONS

Andy Warzon, et al. "Serverless CI/CD for the Enterprise on the AWS Cloud—Quick Start Reference Deployment", Amazon Web Service, Apr. 2019, 19 Pages.
Netflix Technology Blog, "The Nefflix Simian Army", Retrieved from https://medium.com/netflix-techblog/the-netflix-simian-army-16e57fbab116 on Aug. 20, 2019, 9 pages.

(Continued)

*Primary Examiner* — Lan-Huong Truong
(74) *Attorney, Agent, or Firm* — Robert C. Kowert; Kowert, Hood, Munyon, Rankin & Goetzel, P.C.

(57) ABSTRACT

A collection of fault categories, including faults associated with internal resources at a provider network, is presented via an interface of a fault injection service. A fault injection mode, selected from a set which comprises a non-randomized mode, to be used to inject faults into a target environment is determined. Fault injection agents introduce faults into the target environment in accordance with the fault injection mode.

20 Claims, 11 Drawing Sheets

(56) References Cited

OTHER PUBLICATIONS

"Amazon Virtual Private Cloud", Retrieved from https://docs.aws.amazon.com/vpc/latest/userguide/endpoint-service.html on Sep. 15, 2019, 18 Pages.

Unknown, "Testability scenarios", Retrieved from https://docs.microsoft.com/en-us/azure/service-fabric/service-fabric-testability-scenarios on Jan. 12, 2021, pp. 1-9.

Unknown, "Introduction to the Fault Analysis Service", Retrieved from https://docs.microsoft.com/en-us/azure/service-fabric/service-fabric-testability-overview on Jan. 12, 2021, pp. 1-6.

Unknown, "Induce controlled Chaos in Service Fabric clusters", Retrieved from https://docs.microsoft.com/en-us/azure-service-fabric/service-fabric-controlled-chaos on Jan. 12, 2021, pp. 1-13.

\* cited by examiner

Fault category examples 410

- Dropped packets 412
- Delayed packets 414
- Corrupted/modified packets 416 (including random corruptions as well as semantically meaningful modifications)
- Service subcomponent failures 418 (e.g., indexing layer failure at database service)
- Data plane disconnections 420
- Control plane disconnections 422
- Autonomous service cell failure 424
- Storage device failure 426
- Tagged resource failure 428
- Loss of route table entries 430
- Load balancer failure 432
- Malfunctioning redundancy/replication algorithm 434
- Loss of Internet access 434
- Spike in request rate 435
- ...

*FIG. 4*

FAULT INJECTION SERVICE

BACKGROUND

Many companies and other organizations build and deploy applications using network-accessible services of provider networks or cloud computing environments. For example, some clients of provider networks may utilize compute instances (e.g., guest virtual machines) of a computing service of a provider network, storage objects stored at one or more storage services, databases supported by a relational or non-relational database service, load-balancers of an auto-scaling service and the like, collectively to implement one or more applications that are then exposed to the clients' end customers via web-services or similar interfaces. In some cases, the provider network may include a software development and deployment service which can be used by clients to develop and deploy their applications, with resources of other provider network services being used at various stages of the deployment pipeline.

The benefits of using provider network services for client applications may include, among others, high levels of scalability, manageability, security, availability, and worldwide accessibility, all obtained at relatively low costs. Clients may be able to use the provider network services to design, develop and deploy complex applications whose implementation may not otherwise have been feasible given typical constraints on in-house resources at the clients' organizations. In general, clients may not have to concern themselves with many of the internal details of the underlying provider network services, including hardware configurations, networking-related settings, and the like.

As the level of sophistication of the applications deployed on behalf of provider network clients increases, the complexity of testing the resilience of applications to unusual events also rises. Especially when multiple services are used for a given application, with operations using resources of different services being performed at very high rates (e.g., tens of thousands of operations per second), and with the resources distributed among numerous data centers around the world, anticipating all the different types of events and event sequences that could potentially lead to application errors or sub-par application behavior becomes extremely difficult for the clients on whose behalf the applications are configured.

BRIEF DESCRIPTION OF DRAWINGS

FIG. 4 illustrates example categories of faults that may be injected by a fault injection service at client request at one or more services of a provider network, according to at least some embodiments.

Figure 1:
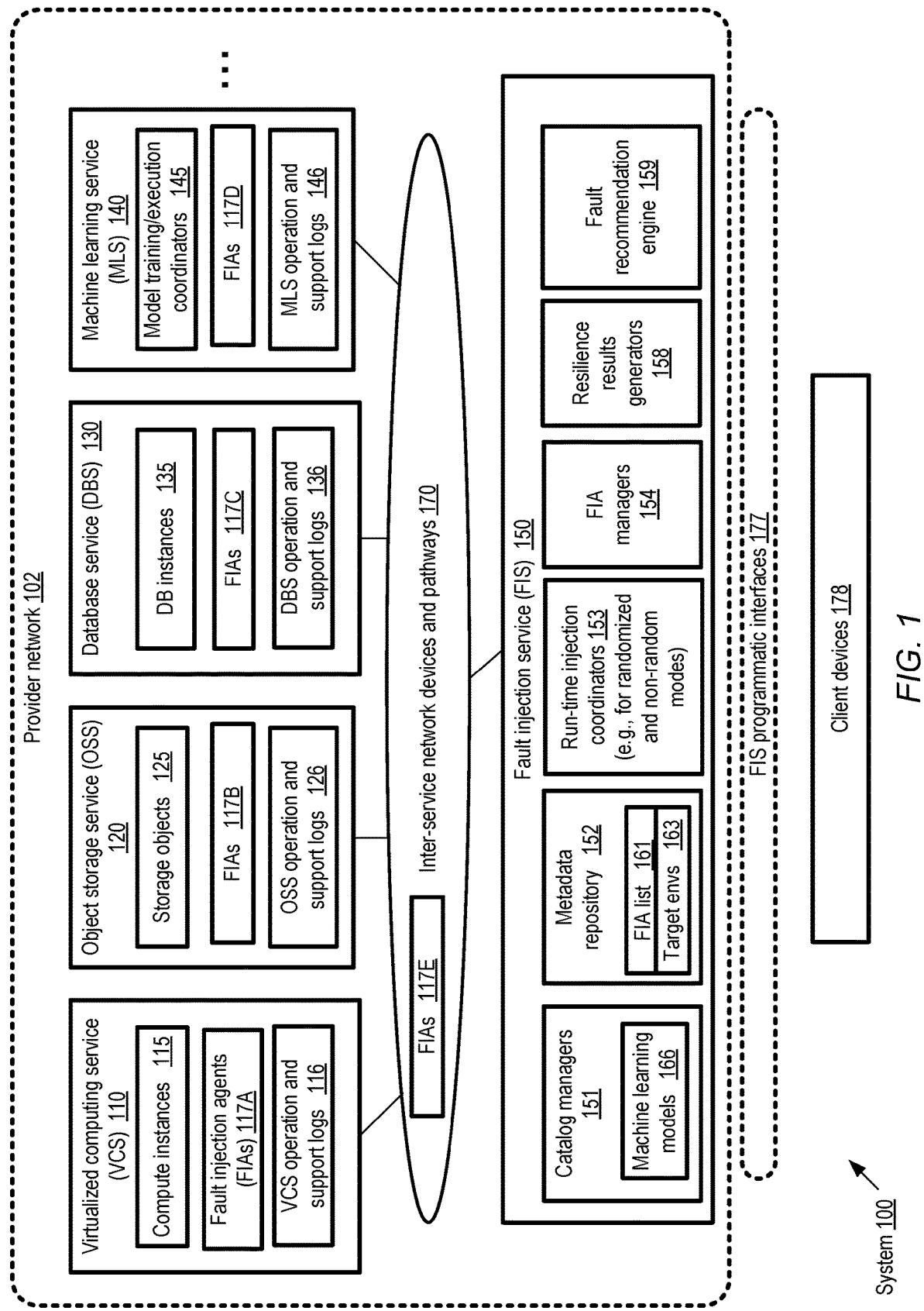
FIG. 1 illustrates an example system environment in which a fault injection service may be implemented at a provider network, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for implementing a fault injection service to test the robustness of applications that utilize provider network resources are described. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries). In at least some embodiments, a given application of a provider network client may utilize resources of one or more services of the provider network—e.g., computing resources of one or more virtualized computing services may be used to execute the logic of the application, one or more storage or database services may be used for storing data and metadata of the application, load-balancing and other networking-related services may be used to direct application requests and responses, and so on.

Generally speaking, faults (e.g., undesired events or undesired sequences of events, such as the dropping of packets containing application requests, or the corruption of a file or message) that result in sub-optimal application behaviors as perceived by application clients (e.g., failures to respond to requests from the application clients, delays in responding to such requests, incorrect responses to requests, loss of data or request contents, and so on) may occur at any combination of the provider network services being used for a client's applications. In order to help determine the extent to which a given application can withstand such faults, the provider network may establish a fault injection service (FIS) in at least some embodiments, and enable clients to use the fault injection service to subject the clients' applications to various types of faults at client-controlled rates during client-specified testing intervals. Note that to deliberately inject a fault (i.e., to cause an undesired event or sequence of events that may in turn, at least in some cases, cause an application to misbehave or fail), in many cases administrative or control-plane privileges may be required with respect to one or more internal resources of the services, and such privileges may not typically be provided directly to the clients themselves; as such, an authorized intermediary such as an FIS may be required to at least some types of fault resilience testing. The terms "fault injection" and "fault introduction" may be used synonymously in various embodiments to refer to operations that are performed by or on behalf of the FIS to alter the behavior of one or more resources, relative to the normal or baseline behavior which would have occurred in response to the application's workload in the absence of interference by the FIS. Note that while the injection of one or more faults may alter the behavior of an application which is targeted by the fault(s), the application may in at least some cases withstand or overcome the fault injection, without any negative consequences being experienced or perceived by end users of the application in some embodiments. As such, fault injection as described herein may represent an effort to perturb an application, and the extent to which the application is able to avoid such perturbations may indicate the robustness of the application to the injected faults.

Clients of the FIS may choose various parameters of the fault injection procedures in different embodiments via easy-to-use programmatic interfaces; such parameters may include the granularity of the targeted resource set (e.g., whether the client wants faults injected at various points within an isolated virtual network set up for the client, only at a particular virtualization server or host, or only at a particular compute instance or storage object), the specific categories of faults to be injected, whether fault injections should be scheduled in a randomized or pre-specified deterministic sequence, inter-injection time intervals, whether recovery from or remediation of a prior fault should be taken into account when injecting another fault, and so on. Furthermore, for those clients who wish to leave such decisions primarily to the FIS, default settings for various parameters may be used, or FIS-recommended settings approved by the client may be used.

In various embodiments, at least some sequences of events that lead to application misbehavior may span multiple services, and/or take place over intervals of times during which the misbehavior-causing events are interspersed with large numbers of harmless events (events that do not cause application misbehaviors). As such, identifying the events that cause the applications to misbehave may itself represent a non-trivial exercise. In at least some embodiments, one of the responsibilities assigned to the fault injection service may include generating, and continuously improving, a catalog of fault category descriptors, with individual descriptors indicating or describing respective sequences of one or more events at one or more resources, which may be used to test application resiliency to faults. A number of data sources may be analyzed, e.g., with the help of machine learning models and other analytics tools in some embodiments, to identify such fault categories in various embodiments. For example, operation records (including logs generated at various layers of the hardware/firmware/software stacks) of various provider network services, customer support-related logs, knowledge bases such as wikis and the like maintained by software developers, engineers and architects associated with the different services, may all be examined at the fault injection service to develop such fault catalogs. In effect, the experience of the staff of the provider network in identifying and resolving root causes of problems encountered at widely-ranging applications for thousands of clients, collected over years of application deployments at locations around the world, may be distilled in identifying the faults represented in the catalog in at least some embodiments. Furthermore, with the help of analytics algorithms that can consume event logs with millions of entries, causal chains of application misbehavior-causing events that occurred across resources of multiple services, as well as at networking intermediary devices between the services, may be identified in at least some embodiments and included in the catalog; identifying such chains may be hard even for the most experienced support staff or engineering personnel.

To a given provider network client whose applications utilize some combination of provider network services (e.g., a virtualized computing service (VCS) and a storage service (SS)), a subset of the catalog pertinent to the specific services used by the applications may be presented, e.g., via programmatic interfaces of the FIS in some embodiments. Some clients may then select some number of fault categories, based on the information provided in the catalog's records or descriptors, to be injected into specified target application environments in at least some embodiments; other clients may rely on the FIS to select a set of faults to be injected into the target application environments, or approve recommendations for fault injection provided by the FIS. Clients may also indicate a fault injection mode programmatically in at least some embodiments—e.g., whether faults of a particular set of categories are to be selected and/or scheduled at random, or whether a more deterministic (non-randomized) selection and scheduling approach is to be taken. Deterministic, repeatable schedules of fault injection may be referred to as regression tests in some embodiments; a suite of such regression tests may be developed over time for a given application or a given target environment in such embodiments. According to at least some embodiments, clients may also provide an indication of the rates at which faults of one or more categories are to be introduced or injected into a target environment, and/or the severity of the faults to be introduced over time.

Fault injection agents (e.g., processes or threads run at various virtual and/or physical computing or storage devices) may be used to inject the selected faults on behalf of the clients in various embodiments, and reports or results of the faults introduced may be provided to the clients if desired. Such agents may also be referred to as fault injection proxies in one embodiment. In at least some embodiments, if requested, an overall resiliency report or score may be provided to a client for the client's applications, indicating the extent to which the applications were able to withstand various types of fault events, or the types of application errors/failures that occurred as a result of the introduction of the faults. For example, a client may be informed that a client application App1 was able to withstand occurrences of faults of types F1 and F2, that App1 was affected somewhat by faults F3 and F4 in that some responses to requests directed to App1 were delayed slightly, but that App1 failed to recover from a multi-service fault sequence F5-F6. In some embodiments, the FIS may be able to detect the impact of different faults on a given client application using tools or logs indicated by the client; thus, operation records generated and/or stored at one or more services used by the application may be examined to detect the impact of different faults on the normal operations of the application. Using such information provided by the FIS, the client may for example introduce changes into App1 to be able to better withstand faults F3, F4, F5 and F6 in the future, and/or provide workarounds for end users of App1 to utilize when such faults are encountered. In some embodiments, based on the analysis of the data sources available to the FIS, the FIS may also be able to provide recommendations on the kinds of changes that a client may need to make to make an application more robust. For example, the FIS may have access to customer support records that indicate that a particular type of configuration change had, in the past, enabled an application to withstand errors of a certain type, and an indication of such a configuration change may be provided to the client if applicable.

As one skilled in the art will appreciate in light of this disclosure, certain embodiments may be capable of achieving various advantages and practical applications/benefits, including some or all of the following: (a) providing actionable evidence which can be used to enhance the robustness of applications to various types of undesired/unexpected faults in the software, hardware or networking resources being used for client applications, using tools that rely on years of experience with provider network services and cannot be obtained by provider network clients acting on their own, (b) reducing the amount of computing and other resources that may have to be employed by clients of the provider network to debug their applications, and/or (c) reducing the amount of computing and other resources that may have to be deployed for customer support operations of the application providers.

According to some embodiments, a system may comprise one or more computing devices, e.g., of a fault injection service of a provider network. The computing devices may include instructions that upon execution on or across one or more processors cause the devices to generate, based at least in part on analysis of internal operation records of one or more other services of the provider network, at least a portion of a catalog of fault category descriptors or records. An individual descriptor or record may indicate, for example, one or more targeted resources or artifacts whose behavior, operation or content is going to be modified as a result of injection of a fault in some embodiments. In some embodiments, additional fault attributes, such as a severity level deduced using analysis of past fault remediation efforts, may be provided for at least some descriptors of fault categories. The catalog may include descriptors covering a wide variety of faults in some embodiments—e.g., some faults may be associated with individual internal resources of a single service of the provider network, with other faults may be associated with a plurality of internal resources of one or more services, such that correlated events at the plurality of resources eventually lead to unexpected or undesired application behavior. The latter type of fault may be referred to as a correlated fault in one embodiment. In at least some embodiments, the behavior of an internal resource may be modified from an administrative or control plane of the corresponding service (e.g., using "super-user" privileges of the service) to inject a fault, whereas client-facing interfaces of the service may not be usable to inject a fault at the internal resource. Thus, in such embodiments, clients may not be able to directly introduce at least some types of faults whose descriptors or records are included in the catalog. In at least some embodiments, a traffic interceptor or proxy may be set up for messages/packets flowing between a set of client devices and a given service (or between a pair of services), and some types of faults (e.g., packet drops, packet delays, etc.) may be injected with the help of such a proxy. Such proxies represent a fault injection mechanism which does not require service "super-user" privileges in at least some implementations, and may thus provide an addition degree of freedom with respect to permissions required for fault injection by an FIS.

The catalog, or a portion thereof, may be presented via one or more programmatic interfaces of an FIS to a client in various embodiments. A wide variety of programmatic interfaces may be implemented at the FIS in different embodiments, e.g., including web-based consoles, graphical user interfaces, command-line tools, application programming interfaces (APIs) and the like. An indication may be obtained, e.g., from the client via the one or more programmatic interfaces, of a (a) target environment associated with an application of the client which utilizes one or more services service, and (b) a fault injection mode. Any of a variety of application testing and/or production environments may be selected for fault injection in different embodiments, such as a stage of a deployment pipeline, one or more isolated virtual networks (IVNs) set up on behalf of the provider network at a virtualized computing service, an arbitrary collection of one or more storage servers or compute instances selected by a client, and so on. The fault injection mode may be selected from a set which comprises at least a non-randomized mode (in which a pre-selected sequence of faults may be introduced into the target environment) and a randomized mode (in which faults of one or more categories may be selected and/or scheduled randomly) in some embodiments.

The fault injection service (FIS) may identify a set of fault injection agents (FIAs) for the target environment in some embodiments. Individual ones of fault injection agents, which may for example comprise some combination of software and/or hardware components, may be set up before the client's preferences are obtained in at least one embodiment, e.g., as elements of the hardware/software stack that can be activated or deactivated in response to commands sent from the FIS. In some embodiments, respective fault injection agents may be configured to introduce a single category of faults at a single resource, while in other embodiments a given FIA may be capable of introducing multiple faults, including correlated faults, associated with one or more resources. The FIAs identified for injecting faults of one or more categories in the client's target environment may be activated by the FIS (e.g., by sending respective commands or messages), and the corresponding faults may be introduced into the target environment in various embodiments. In some embodiments, one or more FIAs may be instantiated at a target environment after a client's request to inject faults into that environment is received at the FIS. An indication or report of the injected faults may be provided to the client in at least one embodiment.

According to at least some embodiments, the programmatic interfaces of the FIS may enable a client to dynamically specify a fault injection rate or level, and an indication of a desired rate or level may be used by the FIS to schedule injected faults relative to one another. For example, a client may choose the fault injection rate on a scale of 0 to 100, with 100 representing the maximum supported rate, 0 representing no injection, and 1 representing the lowest supported non-zero rate in one implementation. In other implementations, a client may specify the absolute rate at which faults of various selected categories are to be injected—e.g., one fault of type T1 every 5 seconds, one fault of type F2 every minute, and so on. In at least one embodiments, respective severity levels may be assigned for at least some of the fault categories indicated in the catalog, and a client may dynamically change the severity of the faults being injected into a target environment.

In some embodiments, as mentioned above, the FIS may support multiple fault injection modes, with the modes differing from one another with respect to the randomness of the selection and/or scheduling of the fault injections. For example, a client may choose a non-random mode of fault injection for one or more resources of a target application environment, and specify a sequence of faults to be introduced at each resource as well as the intervals between the faults: e.g., by providing a preferred fault injection schedule similar to the following [Resource R1: Fault F1, followed by 60 second pause, followed by fault F2, followed by 20 second pause, followed by fault F1 again, . . . ,]. Some clients may request random selection and/or random scheduling for their target resources, e.g., by indicating a preferred fault injection schedule similar to the following: [Resource R2: choose any of faults F3, F4, F5, F6, and schedule the next fault after a time interval randomly selected between 1 and 30 seconds]. In at least some embodiments a client may request the equivalent of a recording of such a randomized schedule, so that the same sequence of faults (which was initially selected at random) can be re-applied or re-played if desired by the client (e.g., in response to a programmatic sequence replay request from the client) for regression testing purposes.

After some types of faults are injected into a target environment at the request of a client, a client may wish to pause or delay further fault injection in some embodiments, especially if the faults are being injected into production environments where they may affect end user experience. In one such embodiment, a client may programmatically provide an indication of a resumption approval workflow associated with a particular set of faults and a specified environment into which the set of faults is to be injected. Steps of such a workflow may, for example, require that the FIS obtain an approval from an authorized entity specified by the client before resuming additional fault injection after a given type of fault has been injected to the environment. In such a scenario, the FIS may defer the injection of one or more faults after a particular fault of the given type has been introduced, until an approval indicator from the authorized entity specified in the workflow has been obtained via a programmatic interface.

In at least one embodiment, in addition to providing descriptors of the kinds of faults which may be introduced into target environments on behalf of a client, the FIS may also provide indications of the performance overhead associated with fault injection. For example, an approximate measure of overhead associated with the activation of fault injection agents of various types (e.g., a 0.25% increase in CPU utilization at a virtualization host) may be provided to clients.

Example System Environment

FIG. 1 illustrates an example system environment in which a fault injection service may be implemented at a provider network, according to at least some embodiments. As shown, system 100 includes resources and artifacts of a plurality of network-accessible services of a provider network 102, including a fault injection service (FIS) 150, a virtualized computing service (VCS) 110, an object storage service (OSS) 120, a database service (DBS) 130, and a machine learning service 140 in the depicted embodiment. The various services may be linked via an internal set of inter-service network devices (e.g., switches, routers, gateways, etc.) and pathways 170 of the provider network. Clients of the provider network may utilize resources of one or more of the services to develop and run applications, and access to the running applications may also be provided to end users of the applications from the provider network. For example, a given client may use one or more compute instances 115 of the VCS (such as guest virtual machines, bare metal instances that access at least a subset of the hardware devices of a host without virtualization, and so on), one or more storage objects 125 and/or one or more database instances 135 collectively to provide an application to some set of application clients.

In order to verify or test the robustness of such applications to various types of unexpected or undesired events, a client may submit requests to FIS 150 to introduce combinations of one or more faults into the environments within which the applications are being run in the depicted embodiment. In some cases, such target environments may correspond to a testing stage of a software development and deployment pipeline being executed at another service of the provider network, as discussed below in further detail. In some embodiments, the faults may be introduced into production environments of the applications if desired by the clients. In at least one embodiment, a client may select any desired combination of resources (which need not be in a production environment) as a target environment into which faults are to be introduced.

The FIS 150 may implement a set of programmatic interfaces 177 in the depicted embodiment, such as one or more web-based consoles, graphical user interfaces, command-line tools, APIs and the like, which may be used to submit fault injection related requests and preferences from client devices 178 (e.g., laptops, desktops, mobile computing devices and the like). Using such interfaces, a client may for example specify the target environments into which faults are to be introduced for testing, the categories of faults to be introduced, the fault injection mode (e.g., whether randomly selected faults are to be injected, whether a deterministic sequence of faults selected by the client is to be used, etc.), rates at which faults are to be scheduled, the time period for which faults are to be introduced, the manner in which results of the introduction of the faults are to be detected and presented, and so on.

According to at least some embodiments, the FIS may include one or more catalog managers 151, responsible for generating and updating a collection of descriptors of the different kinds of faults than can be introduced at client request. As also discussed below in the context of FIG. 2, contents of a number of different data sources may be analyzed by the catalog managers 151 to prepare the descriptors in various embodiments. For example, various services implemented at the provider network, such as the VCS, the OSS, the DBS and the MLS may each have a set of internal operation and support logs in the depicted embodiment, and such logs may be analyzed (e.g., using machine learning models 166 trained on behalf of the FIS to perform event correlation and root cause analysis) by the catalog managers to prepare the catalog. Individual fault category descriptors may include, for example, an indication of the targeted resource or artifact whose behavior is to be modified by the interdiction of a fault, a summary of the operations that are run to introduce the fault, an indication of the severity of the fault (e.g., based on an analysis of how easy or difficult it has been in the past to overcome such faults), an indication of the fault injection agents (FIAs) that are responsible for introducing the faults, and/or various other properties of the faults of the category. In the embodiment depicted in FIG. 1, the data sources analyzed to generate the catalog may include, among others, VCS operation and support logs 116, OSS operation and support logs 126, DBS operation and support logs 136, as well as MLS operation and support logs 146. In some embodiments, machine learning models 166 used for generating fault category descriptors of the catalog may be trained and run using the MLS 140 and/or compute instances 115—as such, the FIS 150 may use one or more other services of the provider network to develop the catalog. In at least some embodiments, the catalog may be enhanced over time, as more knowledge is gathered at the provider network regarding the occurrence and causes of various types of errors, failures or sub-optimal behaviors (e.g., worse-than expected performance) of client applications.

In preparation for client requests to introduce faults into application environments that use resources of the various services (as well as network devices and pathways 170 that link the services), one or more FIA managers 154 of the FIS may configure a number of fault injection agents (FIAs) 117 in the depicted embodiment. Such agents may for example comprise one or more threads of execution, processes, or hardware elements associated with or running at service resources such as compute instances 115, storage objects 125, database instances 135 and/or machine learning model training/execution coordinators 145. In FIG. 1, FIA 117A may be set up at the VCS 110, FIAs 117B may be established at the OSS 120, FIAS 117C may be configured at the DBS 130, FIA 117D may be established at the MLS 140, and FIA 117E may be set up at the inter-service network devices and pathways 170. In various embodiments, the FIAs 117 generally may be configured to consume minimal resources, e.g., by remaining dormant or passive, until a command is received from the run-time injection coordinators 153 of the FIS 150. An FIA list 161 may be maintained at metadata repositories 152 of the FIS in the depicted embodiment. In one embodiment, at least some FIAs 117 may be dynamically instantiated and/or decommissioned—e.g., an FIA 117 may be instantiated at a target environment in response to a fault injection request, used for some time to inject faults, and then terminated or decommissioned.

According to at least some embodiments, a client of the FIS may submit a programmatic request via interfaces 177 to view at least a portion of the catalog of fault categories. In some embodiments, such a request may indicate the set of services being used by the client's applications, and the catalog managers 151 may use the information about service use to prune the catalog and provide only a relevant subset to the client. For example, if a client is only using the VCS 110 and the DBS 120 for a given application, faults associated specifically with the OSS 120 and MLS 140 may not be included in the view of the catalog provided to the client. Some of the fault categories in the catalog may be associated with single resources at single services, while others may be associated with multiple services and/or multiple resources within a given service, or with inter-service networking devices or pathways. In one embodiment, a client may not necessarily indicate the set of services being used by the client's application(s). Instead, for example, an FIS catalog manager 151 may be able to ascertain, using an identifier of the client which is implicitly or explicitly indicated in the request to view catalog contents, the set of provider network services whose resources have been allocated to the client, and the catalog manager 151 may be able to prune the catalog accordingly. In other embodiments, catalog pruning may not be performed; instead, the entire catalog of available fault descriptors may be made accessible to the client.

A client of the FIS may provide various requirements for fault injection via programmatic interfaces 177 to the FIS 150 in the depicted embodiment. For example, the client may indicate (a) a target environment comprising one or more virtualized and/or physical resources associated with an application of the client which utilizes at least one provider network service, (b) a fault injection mode, selected from a set which comprises at least one non-randomized mode and one randomized mode, and/or (c) a fault injection rate or schedule for one or more resources of the target environment (e.g., indicating for how long, and how frequently, various faults of specified or default severities are to be inserted at the target environment). A list of the specific categories of faults to be introduced may also be provided programmatically by the client in at least some embodiments; in other embodiments, the FIS may be able to infer or select faults to be introduced based on the other information provided by the client (such as the target environment, the fault injection mode, etc.) Information about the target environment 163, supplied by the client, may be added to the metadata repository 152 in some embodiments.

Based on the requirements of the client, run-time injection coordinators 153 may identify a set of fault injection agents to be utilized for the target environments in various embodiments. In some embodiments, a given FIA 117 may be configurable to introduce multiple types of faults at one or more resources; in other embodiments, a given FIA may able to introduce (a) one type of fault at a single resource, (b) several different types of faults at a single resource, (c) a single type of fault at multiple resources or (d) one or more types of faults between (e.g., with respect to network paths) a plurality of resources. Run-time injection coordinators 153 may then cause the FIAs to introduce faults based on the client's preferences at the target environment in the depicted embodiment, e.g., by sending commands to the FIAs. In some embodiments, a specific command may be sent for each instance of a fault, while in other embodiments a higher-level command describing a desired fault type selection strategy and scheduling strategy may be sent to an FIA and used at the FIA to introduce multiple faults.

One or more resilience results generators 158 may provide results of the requested fault injections to clients via programmatic interfaces 177 in the depicted embodiment. In some embodiments, the results may be as simple as a timestamped list of faults that were injected. In other embodiments, the FIS may attempt to capture data indicating the impact of the fault injections, e.g., whether the rate at which the application was able to send responses to received requests fell, whether one or more processes implementing the application failed, and so on, and such data may be provided along with an indication of the injected faults. According to at least one embodiment, the results generators 158 may provide a resiliency score or report, indicating for example which types of faults were handled gracefully by the client's application, which types of faults caused minor disruptions, and which types of faults the application was unable to withstand (e.g., resulting in termination/hangs of the application). In at least some embodiments, as part of the information provided to the FIS regarding desired fault injection properties, a client may supply an indication of metrics sources that can be accessed from the FIS (e.g., by the resilience results generators 158) to determine the impacts of the injected faults. Such metrics sources may, for example, include response time metrics generators of the application, responsiveness/aliveness monitors of the application, throughput reporters of the applications, application-generated logs, and so on in different embodiments.

In at least some embodiments, one or more fault recommendation engines 159 may be established at the FIS 150, responsible for suggesting fault categories, fault injection modes and/or schedules to clients based on the analysis of the clients' target environments and applications. Thus, for example, a client may obtain a set of recommended faults, elect to use the MIS's recommended fault combinations initially, and then modify the combinations if desired after trying out the MIS recommendations. In some embodiments, some clients may be willing to rely on the accumulated expertise of the provider network operator and staff, and use recommended fault injection strategies instead of developing their own strategies. The recommendations may be generated with the help of analytics tools such as machine learning models in some embodiments, which analyze the data sources available to the FIS. Using such tools, the FIS may in some embodiments identify as recommended faults, a set of faults that (a) have occurred at a rate above a threshold selected for the client in realistic application environments in the past (b) have led to application misbehaviors in the past (e.g. for other clients or the same client) and (c) are non-trivial to resolve and hard for clients to replicate on their own. Other recommendation criteria may be used in some embodiments.

According to at least one embodiment, third party software and/or hardware vendors (e.g., business entities other than the operator of the provider network 102, who also have expertise in fault analysis and management) and/or FIS clients may design and develop some types of fault injection agents (FIAs 117) which can be used by the FIS 150. In one such embodiment, just as a catalog of fault categories is made available by the FIS, a catalog or online marketplace of types of fault injection agents (e.g., installable programs and/or hardware devices that can be used to trigger at least some types of faults) may also be made available by the FIS 150 using programmatic interfaces 177. In some embodiments, an FIA manager 158 of the FIS 150 may select one or more such third-party or client-designed FIAs for use at some target environments at which faults are to be injected per a client's request, e.g., with the selection being based on an analysis of the target environment and the available third-party FIA types. In at least one embodiment, an FIS client may use programmatic interfaces 177 to indicate preferred third-party FIAs (or client-designed FIAs) to be used for the client's target environment. Instances of the selected FIA types may be set up in accordance with the client's preferences by the FIS 150.

Example Catalog Generation

Figure 2:
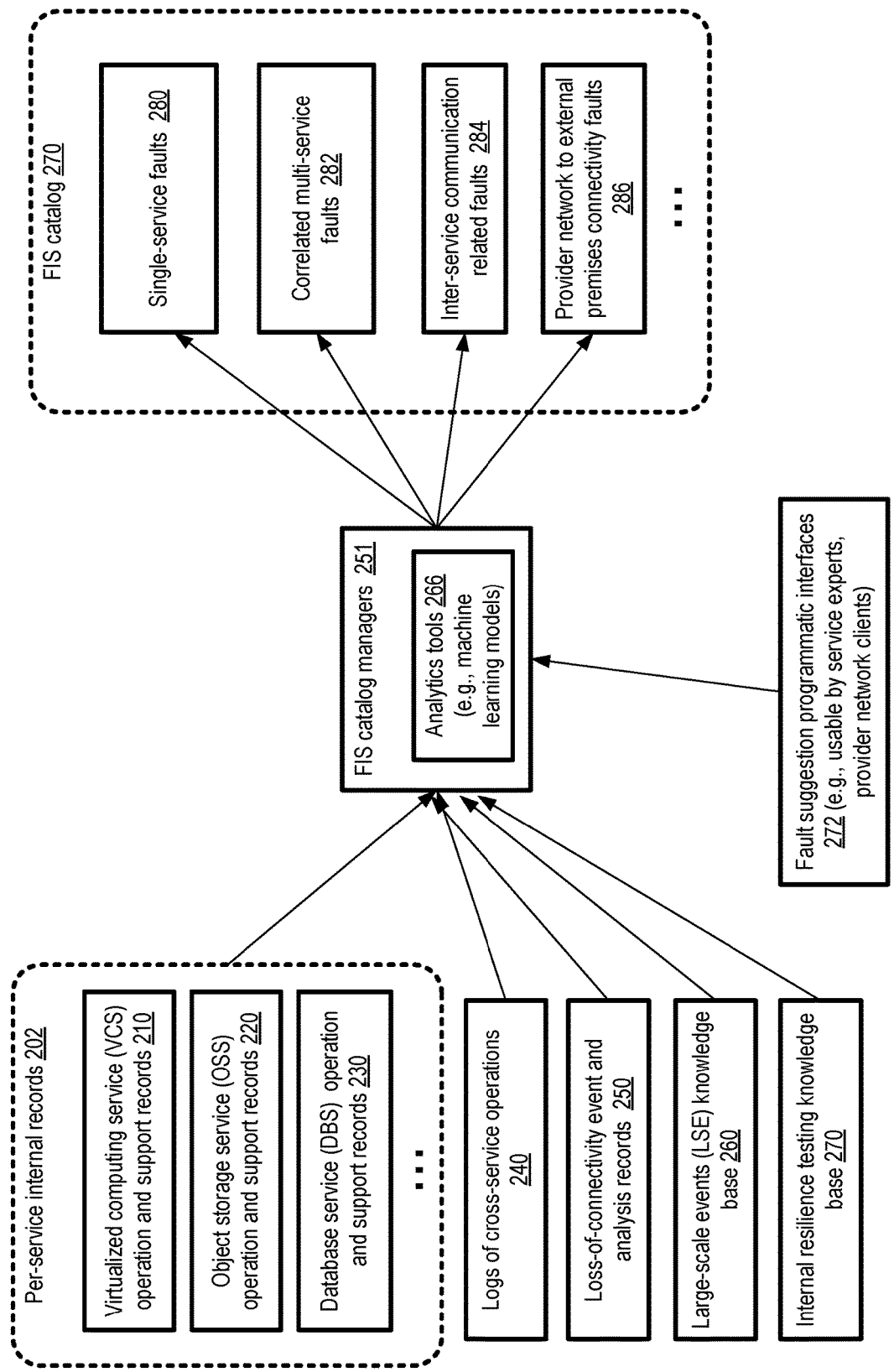
FIG. 2 illustrates a high-level overview of the preparation of a catalog of fault categories at a fault injection service, according to at least some embodiments.

FIG. 2 illustrates a high-level overview of the preparation of a catalog of fault categories at a fault injection service, according to at least some embodiments. A number of data sources may be analyzed by one or more catalog managers 251 of a fault injection service (FIS) (similar in features and functionality to FIS 150 of FIG. 1) in the depicted embodiment to identify or detect instances of occurrences of various types of faults which led to errors, failures, or undesired behaviors, and then to generate catalog entries indicating the faults and corresponding injection techniques. Per-service internal records 202 of a number of different provider network services may be consumed as input by the catalog managers 251, including VCS operation and support records 210, OSS operation and support records 220, DBS operation and support records 230, and so on. The internal records may include, for example, log records generated at various software and hardware components of a given service during normal operation, as well as records generated by customer support personnel in response to customer complaints (e.g., defect reports entered into a support database, defect resolution records, etc.) pertaining to the services. Logs 240 of cross-service operations (operations involving messages sent between different provider network services, e.g., via service access endpoints, gateways and hubs of the kind discussed below in the context of FIG. 5) may also be examined by the catalog managers in at least some embodiments.

In at least some embodiments, connectivity between parts of the provider network may be lost from time to time, although such events may typically be very infrequent. Records 250 pertaining to the detection, analysis and resolution of such events may also be used to generate fault catalog entries in some embodiments. Some rare failures at the provider network, in which entire data centers (or availability zones comprising one or more data centers) become inaccessible as a result of cascading lower-level failures, widespread power outages, natural disasters and the like may be classified as "large-scale events" or LSEs, and a knowledge base 260 regarding such LSEs may also be consulted to generate some fault category catalog entries in the depicted embodiment.

The provider network operator may conduct various resilience/robustness tests internally, e.g., before rolling out new features or new services. A knowledge base 270 pertaining to the kinds of tests conducted for such purposes, as well as the lessons learnt from such resilience tests, may also provide input for the FIS catalog managers to analyze in the depicted embodiment. In one embodiment, a set of programmatic interfaces 272 may be implemented by the FIS to enable service experts (e.g., architects and engineers involved in the design and implementation of various provider network services) and/or provider network clients to provide suggestions for faults which should be included in the catalog. Input obtained via such interfaces may also be examined by the FIS catalog managers 251 and used to generate or identify one or more fault categories included in catalog 270.

The total amount of input obtained at the FIS catalog managers may be quite large in some embodiments—e.g., millions of log records may be generated at each service every day, and the knowledge bases may keep growing at a rapid pace. In at least some embodiments, as mentioned earlier, one or more analytics tools 266 such as machine learning models may be used to analyze the data obtained from the sources. For example, machine learning models may be used to detect instances of faults, classify them into categories based on various similarity criteria, and generate at least some descriptors to be included in a fault category catalog 270 based on the detected and classified faults. A number of different types of machine learning models may be used in some embodiments, including for example natural language processing algorithms (to help detect occurrences of faults that may be logged using non-identical language, to help identify how much effort was involved in remediating/resolving the faults, etc.), pattern matching algorithms, reinforcement learning algorithms, classification algorithms, and so on. The catalog 270 may comprise a collection of (among others) numerous types of single-service faults 280 (each fault being associated with one or more resources of a single service), correlated or multi-service faults 282 (faults which occur at, or affect, resources of several different services at about the same time), inter-service communication related faults 284, connectivity faults 286 between provider network resources and external premises in the depicted embodiment. For each fault category for which descriptors are created for the catalog, additional information such as the types of resources at which the faults can be introduced, the mechanisms to use to introduce such faults, the approximate severity level of the faults, and so on, may also be stored in the descriptors or referenced in the descriptors in at least some embodiments. The catalog 270 may be improved or enhanced over time—e.g., the analytics tools may be re-executed periodically with the most current set of accumulated data, some fault categories that were included earlier may be removed (e.g., as a result of very low frequency of occurrence in recent time intervals) while others may be added, and so on.

Example Detection of Multi-Service Correlated Faults

Figure 3:
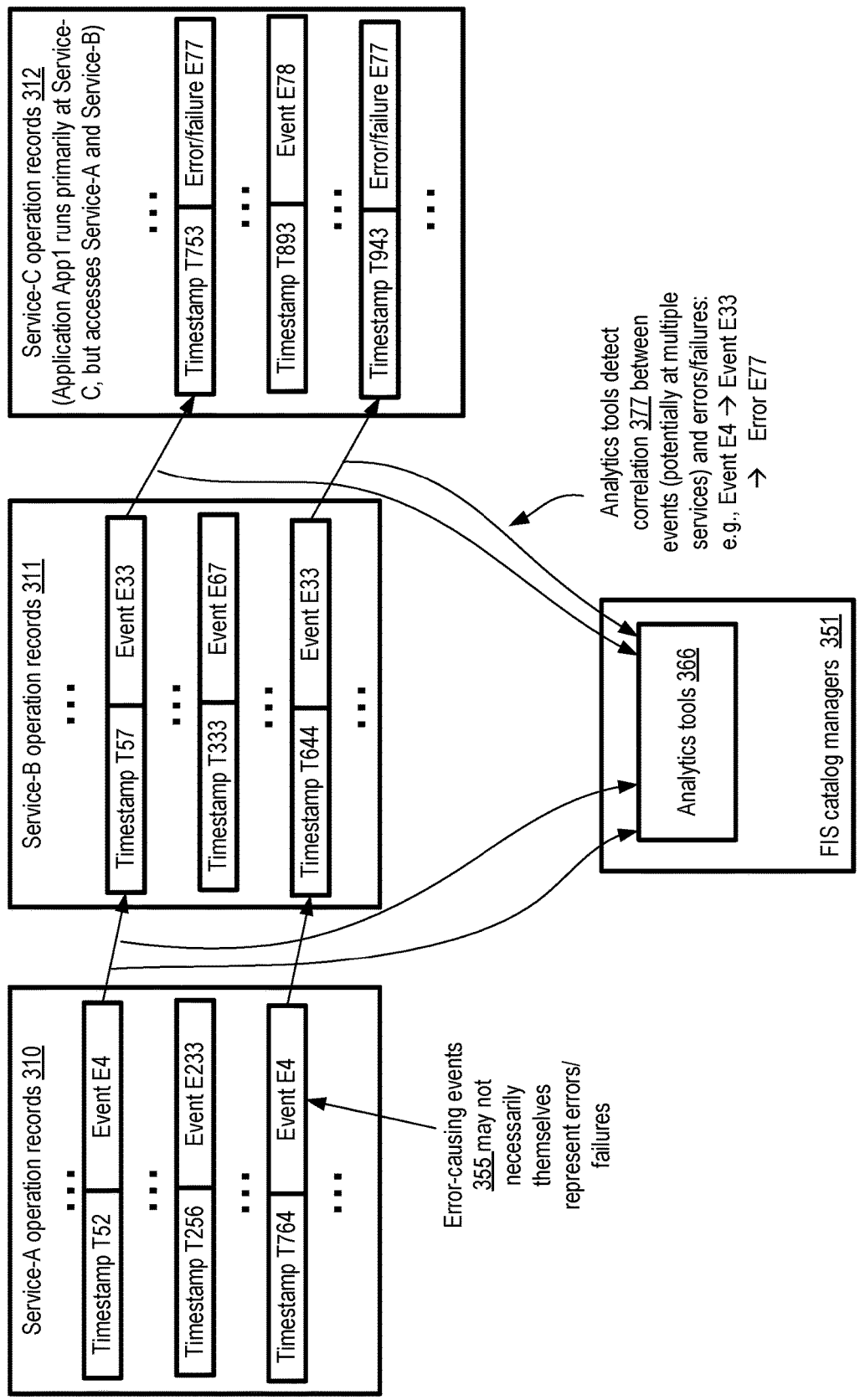
FIG. 3 illustrates an example of the identification of service-spanning event sequences that may lead to application errors or misbehaviors, according to at least some embodiments.

FIG. 3 illustrates an example of the identification of service-spanning event sequences that may lead to application errors or misbehaviors, according to at least some embodiments. In the example scenario depicted in FIG. 3, an application App1 runs primarily at a service Service-C of a provider network, but accesses (e.g., via APIs) at least two other services, Service-A and Service-B.

Operation records 310, 311 and 312 of Service-A, Service-B and Service-C respectively may be examined by FIS catalog managers 351 in the depicted embodiment, e.g., using analytics tools 366. Service-C operation records 312 include indications of two occurrences of errors/failures E77 at times corresponding timestamp T753 and T943; between T753 and T943, various innocuous events such as E78 may have been recorded at Service-C.

Service-A operation records 310 include events E4, E233 and E4 (again) at timestamps T52, T256 and T764, where E4 corresponds to a request from App1 in the depicted example scenario. Service-B operation records 311 include events E33, E67 and E67 (again) at timestamps T57, T333 and T644, where E33 corresponds to a request from App1. A recurring pattern of the sequence of events E4 (at Service-A), followed shortly by E33 (at Service-B), followed shortly by error/failure E77 (at Service-C) may be detected by analytics tools 366 in the depicted embodiment, and identified as an example of a cross-service fault. (Note that while only two occurrences of the E4→E33→E77 sequence are shown in FIG. 3, in practice more numerous repetitions of the pattern may be required to deduce a strong correlation 377 by the analytics tools.) In and of themselves, the events E4 and E33 may not represent errors/failures per se, as indicated in label 355, but the analytics tools may be able to detect the correlation 377 between events at the different services and designate the combination of E4 and E33 as an error-causing multi-service fault. It may be the case that neither E4 by itself, nor E33 by itself, is correlated with App1 misbehavior or errors in the example shown in FIG. 3, and that the occurrence of both (E4 and E33) is required to trigger the error at App1. Furthermore, it may also be the case that if E4 and E33 both occur, but are separated sufficiently in time, the error may not occur at App1; similarly, if E4 and E33 both do occur close together in time, but E33 occurs before E4, errors may not be triggered. The analytics tools may be able to identify very specific conditions that appear to lead to the App1 failure/error event E77 in the depicted embodiment: e.g., that E4 and E33 have to occur within T milliseconds, with E4 occurring before E33.

In some cases, events at a collection of more than two services may be correlated with errors or failures at other services (or within the collection of services). Identifying such chains of events may involve analyzing very large quantities of data in some embodiments, which may not be practicable without the help of analytics tools 366. Furthermore, such analysis may only be feasible using administrative resources of the provider network, as many of the data sources indicated in FIG. 2 and FIG. 3 may not be available to clients of the provider network in at least some embodiments. In various embodiments, clients may not necessarily be aware of the internal resources of the services being used for their applications, and the programmatic interfaces made available to the clients may not be usable to inject faults directly at the internal resources. Provider network clients may only be able to cause faults of some categories to be introduced at target environments with the help of a service similar to the FIS in such embodiments.

Example Fault Categories

FIG. 4 illustrates example categories of faults that may be injected by a fault injection service at client request at one or more services of a provider network, according to at least some embodiments. As requests for various types of service operations required for client operations may be transmitted via network messages, and corresponding internal workflows at the services may also involve messages transmitted between service subcomponents and across service boundaries, many of the fault category examples 410 are directed towards networking in one way or another. Some faults may involve dropping packets 412, or delaying one or more packets 414 of a particular packet flow. Other faults may involve corrupting or modifying packets 416. Modifications of at least two types may be introduced in the depicted embodiment: random changes (e.g., by altering some number of randomly-selected bytes of a packet) as well as semantically meaningful changes (e.g., by changing an original IP address indicated as a source of a packet to another technically valid IP address).

Some types of faults may represent failures 418 of entire subcomponents of a service—e.g., when the index management functionality for a database instance becomes unresponsive, unable to update indexes or respond to index-based queries. Resource of many provider network services may be logically subdivided into two categories: control plane resources, responsible primarily for administrative tasks (such as provisioning computing devices, monitoring performance and availability, etc.) and data plane resources (resource sued primarily for client applications and data). Scenarios in which portions of the data plane of a service gets disconnected (element 420) from the remaining data plane components, and/or from the control plane of the service, may represent another type of fault in the depicted embodiment. Similarly, another type of fault may involve the disconnection of a control plane of a service (element 422) from the remaining control plane components, and/or from the data plane of the service.

In some embodiments, one or more services of a provider network may be implemented as a collection of autonomous and replicable cells, e.g., with each cell comprising some mix of data plane and control plane components configured to perform a respective subset of the service's workload. Failures of such a cell 424 may represent another example of a fault category identified in an FIS catalog in some embodiments. Failures at storage devices 426 (e.g., a device being used to store client data a storage service or a database service) may be included in the collection if faults that the FIS is able to inject on demand. In at least some embodiments, special autonomous cells may be set up at a service primarily for fault injection related testing—e.g., a client may request the establishment of such a fault injection focused cell, and then use the resources within that cell for at least a portion of a client application while faults are introduced into the cell. In some embodiments, a given provider network service may set up some number of cells dedicated for fault injection testing, and clients may be able to request that their applications be configured to use such cells (e.g., by configuring Doman Name Service (DNS) servers at an IVN appropriately). In some embodiments, clients may be able to assign labels or tags to selected ones of the resources (such as compute instances, storage objects, database instances, etc.) allocated or assigned to clients, and one class of faults supported at the FIS may include concurrent or near-concurrent failures of such resources 428 to which a specified tag has been assigned.

Route table loss or removal 430 and failures of load balancers 432 may represent additional examples of faults that can be introduced with the help of the FIS. Some services of the provider network may use chain replication or other types of redundancy/replication algorithms to provide high availability and/or data durability, and malfunctions 434 may be introduced into such algorithms as another example fault category in some embodiments. The loss of access to the public Internet 434, e.g., from a compute instance that remains connected to other resources within the provider network, may be caused by the FIS in some embodiments as another type of fault. In one embodiment, spikes in request rates 435 (e.g., messages requesting one or more operation types, directed to a particular service from a client device or from another service) may comprise another fault category supported by the FIS. Selection and injection of other types of faults than those shown in FIG. 4 may be enabled by an FIS in at least some embodiments.

Example Fault Injection Agents

Figure 5:
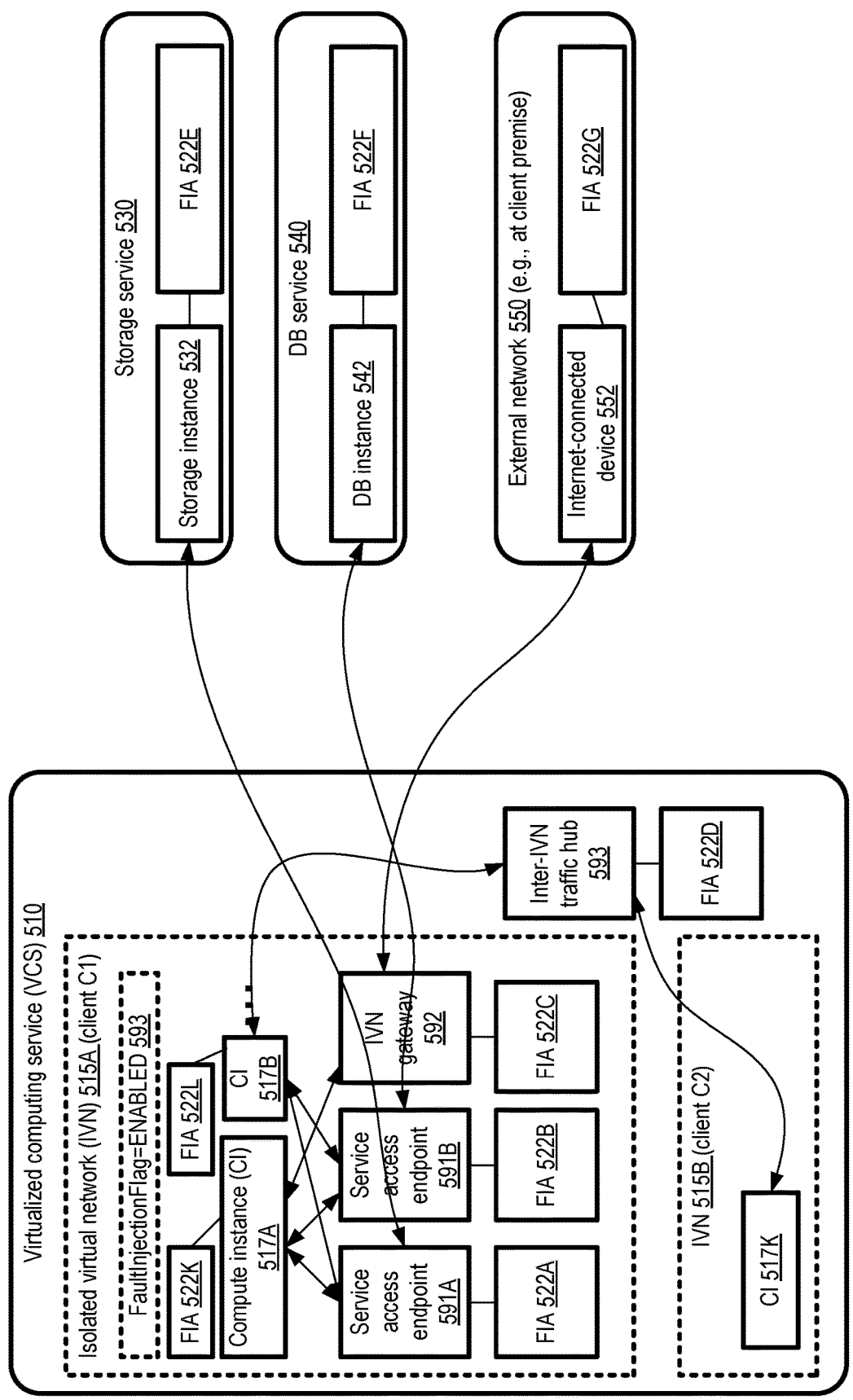
FIG. 5 illustrates example fault injection agents that may be configured at a provider network, according to at least some embodiments.

FIG. 5 illustrates example fault injection agents that may be configured at a provider network, according to at least some embodiments. Within a provider network, in some embodiments, groups of resources (including, for example, compute instances 517 of a virtualized computing service (VCS) 510) may be configured as isolated virtual networks on behalf of respective clients of the provider network. As indicated by the name, an isolated virtual network (IVN) such as IVN 515A or 515B may be logically isolated from the rest of the provider network (and other networks outside the provider network) with respect to various aspects of network configuration—for example, internal or "private" IP addresses may be assigned to resources of a given IVN independently of the addresses assigned within other networks, network security rules of a given IVN may restrict the sources and destinations with which resources of the IVN may communicate, and so on. In the example depicted in FIG. 5, IVN 515A has been configured for client C1, while IVN 515B has been established for a different client C2.

In at least one embodiment, the VCS may provide a programmatic interface to enable/disable fault injection for a given IVN. Thus, for example, a configuration setting called "FaultInjectionFlag" 593 of IVN 515A may be set to "ENABLED" in response to a programmatic request or command from client C1. In one example implementation, a single click on an icon in a web-based console of the VCS may be sufficient to enable or disable fault injection for a specified set of resources such as the IVN. In other embodiments, similar controls or interfaces may be implemented at other granularities—e.g., fault injection may be enabled for individual compute instances, for traffic between an IVN and other networks, and so on.

A number of fault injection agents (FIAs) may be established by the FIS within a VCS 510, at other services of the provider network (such as storage service 530 or database service 540), and/or at external networks such as network 550 set up at a client premise specified by a client of the FIS in the depicted embodiment. Some FIAs such as 522K or 522L may be associated with individual compute instances, or virtualization hosts used for the compute instances. In some embodiments, a given FIA may comprise one or more threads of execution, or processes, set up within the virtualization management components (e.g., a hypervisor, an administrative operating system, virtualization offloading cards, and the like) of a virtualization host at which one or more compute instances are launched. In one embodiment, IP (Internet Protocol) table rules accessed by networking management components of the virtualization management components may be modified to introduce some types of faults. In at least one embodiment, an FIA may comprise one or more threads of execution within a compute instance such as a guest virtual machine or a bare-metal instance.

In some embodiments, networking intermediaries may be configured to enable traffic to flow between compute instances of an IVN and entities outside the IVN. Some provider network services such as storage service 530 or database service 540 may implement web services interfaces to enable users connected to the public Internet to access the services (e.g., via Universal Resource Identifiers or URIs). In some embodiments, the client on whose behalf an IVN 515 is set up may wish to utilize private internal network pathways of the provider network instead of using public Internet pathways (or other pathways outside the provider network) to access such services from the IVN's compute instances (CIs) 517, as the internal pathways may be more performant, and/or more secure, than the pathways which would be traversed outside the provider network. To facilitate such service accesses via provider network pathways without traversing external pathways, special endpoints called service access endpoints (SAEs) or private network endpoints (PNEs) with private network addresses within the IVN may be set up for one or more provider network services in some embodiments. In some embodiments, one or more virtual network interfaces (VNIs) may be established for such endpoints within the IVN—e.g., an SAE may be implemented using a compute instance and the VNI may be programmatically attached to the SAE's compute instance. A VNI may comprise a logical entity with a set of networking and security-related attributes that can be attached to (or detached from) a compute instance and/or other computing devices programmatically, or used for routing purposes within an IVN without necessarily being attached to a compute instance.

In the example configuration shown in FIG. 5, SAE 591A has been set up to enable traffic to flow between CIs of IVN 515A (such as CI 517A and CI 517B) and storage service 530, and SAE 591B has been set up to enable traffic flow between the CIs of IVN 515A and DB service 540. When a packet is to be sent to the storage service from a CI within IVN 515A, it may first be directed (using the IVN's routing table entries and virtualization management components) to SAE 591A's private address within the IVN, and then forwarded (using an encapsulation or tunneling protocol) over the provider network's internal network pathways to the destination storage instance 532. Similarly, packets in the reverse directions may also be channeled via the SAE 591A to the compute instances from the storage instance 532 via the internal pathways. As such, all of the traffic between the compute instances within IVN 515B and the storage service may pass through the SAE 591A. An FIA 522A (e.g., comprising one or more threads or processes, running at a compute instance to which the VNI of the SAE is attached) may be configured for SAE 591A, and used to inject faults with respect to the traffic flowing between the IVN 515A (whose FaultInjectionFlag setting is ENABLED) and the storage service 530 in the depicted embodiment. For example, FIA 522A may drop some of the packets that were intended to be sent to or from the storage instance 532A, delay the transmission of such packets, corrupt such packets, and so on.

A similar FIA 522B may be configured for SAE 591B, to enable faults to be introduced with respect to traffic flowing between IVN 515A and DB instances 542 of the database service 540. Private IVN gateways such as 592 may be established to enable traffic to flow between the IVN 515A and external networks 550 (e.g., networks set up at a client-owned facility) comprises internet-connected devices 552 with which the CIs may need to exchange messages in the depicted embodiment. FIA 522C may be configured to inject faults with respect to the traffic between IVN 515A and external networks in the depicted embodiment. To facilitate the flow of traffic between different IVNs 515 of the VPC (which may for example have overlapping private address ranges, and may therefore require the use of an encapsulation protocol and/or network address translation), in some embodiments an inter-IVN virtual traffic hub 593 may be configured. An FIA 522D may be associated with such a hub for introducing faults, if desired, within traffic flows from one IVN to another (e.g., for traffic between IVNs 515A and 515B). Using FIAs (such as 522A, 522B, 522C, 522D and the like) configured at service access endpoints, gateways, and traffic hubs may have several benefits in the depicted embodiment. Such FIAs may ensure, for example, that all traffic between a given service and an IVN can be reliably caught for fault injection purposes at a point that is separate from the service's own endpoint (and hence does not require access privileges to the service itself). Secondly, configuring such FIAs may reduce the total number of FIAs which have to be established, e.g., in contrast to a scenario where individual FIAs are set up for each compute instance or virtualization host of IVN 515A which communicates with external services or other IVNs. In addition, in at least some embodiments, at least some such FIAs may represent examples of the kinds of proxies discussed earlier, which may not require service administrative credentials and thus provide greater flexibility with respect to acquiring permissions.

In at least some embodiments, FIAs such as 522E, 522F and 522G may also be configured to inject faults at resources outside the VCS. For example, FIAs 522E and/or 522F, comprising respective threads or processes at one or more storage devices or database servers, may potentially alter the replication or redundancy parameters being used to manage data durability and availability at the storage instance 532A or the database instance 542, disable indexing functionality, free randomly selected database buffers, and so on. FIA 522G (which may also comprise a thread or process) may cause the internet-connected device communicating with IVN 515A to pause operations, restart, and so on. The FIS may implement programmatic interfaces that can be used by clients to request the installation of, and provide the needed authorization credentials for, FIAs at client premises in various embodiments. For example, in order to enable FIS-coordinated fault injection at a client premise device or network, the client may submit the logical equivalent of an "InstallFIAAtExternalPremise" programmatic request in some embodiments.

In one embodiment, some FIAs may be included by default within the software and/or hardware used at various provider network resources, and may remain dormant until commands from the FIS are received to activate or start fault injection. Other FIAs may be dynamically started (e.g., in response to a programmatic request from a client, indicating a target environment for fault injection, a desired fault injection mode, an interval for which faults are to be injected, etc.) and terminated after a desired interval of fault injection has been completed or a desired set of faults has been injected. In some embodiments, configuration settings conceptually similar to the FaultInjectionFlag setting indicated in FIG. 5 may be used for resources outside the VCS as well, and may not be limited to IVNs. In at least one embodiment, support for settings conceptually similar to the FaultInjectionFlag may be designed in to all the resources of various provider network services (as well as resources used for interactions between the services), enabling any given resource to be tested for robustness via the kinds of techniques described herein—that is, testability with respect to dynamically modifiable levels of failure events may be engineered as a built-in or default feature of the provider network.

The extent to which details regarding fault injection at a target environment such as an IVN have to specified by clients may vary in different embodiments. In one embodiment, e.g., in order to simplify the user experience of a client with regard to making choices regarding fault injection at an IVN or similar group of resources, the client may only have to submit a request to enable fault injection (in effect, setting FaultInjectionFlag to ENABLED), and the FIS may then automatically orchestrate the introduction of faults at the IVN. In such embodiments, the FIS may select some categories of faults from its catalog, based for example on an analysis of the kids of operations being performed for the client's applications within the IVN, and choose a randomized fault injection mode for the IVN. In some embodiments, clients may, if desired, approve the selected fault injection strategy before it is implemented. Those clients who wish to exercise more control over the fault injection strategy may provide details such as specific fault categories, frequencies/rates of fault injection, whether randomized or non-random sequencing of faults is to be used, and so on.

Example Use of Deployment Pipeline Stage

Figure 6:
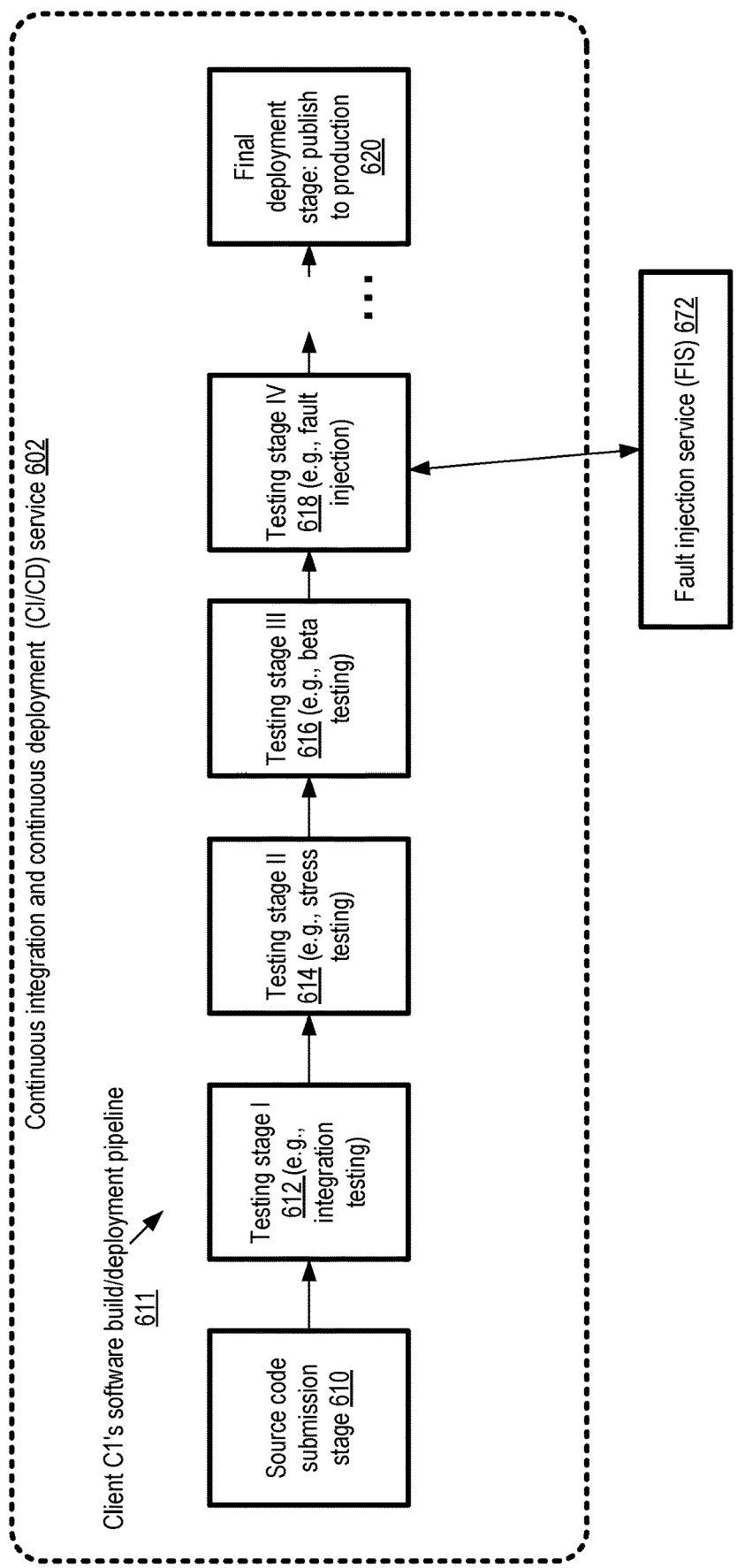
FIG. 6 illustrates an example use of a fault injection service during a testing stage of a software integration and deployment pipeline implemented at a provider network service, according to at least some embodiments.

FIG. 6 illustrates an example use of a fault injection service during a testing stage of a software integration and deployment pipeline implemented at a provider network service, according to at least some embodiments. In the depicted embodiment, the provider network may include a continuous integration and continuous deployment (CI/CD) service 602, which may be used by clients to develop and deploy client applications. The CI/CD service 602 may implement programmatic interfaces which can be used by clients to specify various stages of a build/deployment pipeline for an application, and then to activate the pipeline. An example pipeline 611, established by a client C1, may include a source code submission stage 610, followed by at least four stages of testing (stages 612, 614, 616, and 618) and an eventual final deployment stage 620 in which the application is deployed in a production environment. In some embodiments, respective sets of provider network resources (e.g., IVNs comprising compute instances) may be reserved for each of the stages.

The testing stages may include an integration testing stage 612, a stress testing stage 614 and a beta testing stage 616, for example. In the depicted example scenario, a client may designate a stage 618 specifically for fault injection via an FIS 672, similar in functionality and features to FIS 150 of FIG. 1. The details of the specific operations to be performed at each testing stage may be provided by an application designer or owner in various embodiments—for example, the suites of tests to be run, the levels of workload to be used during stress testing, and a pool of beta testers may be indicated by the application designer or owner. The operations to be performed by the FIS 672 may be indicated by the client using programmatic interfaces of the kind discussed earlier—for example, the client may provide an indication of the provider network services being used by the application being tested, obtain a catalog of applicable fault categories, and then choose parameters such as the mix of faults to be injected, whether the faults are to be injected in a randomized or deterministic mode, and so on. Note that the sequencing of various kinds of testing stages relative to one another may differ in some embodiments from the example shown in FIG. 6—e.g., beta testing may be performed prior to integration testing, a fault injection stage may precede the stress testing stage, and so on.

In some embodiments, a data store may be used to store immutable (write-once) cryptographically verified audit log entries representing various operations that are performed during the pipeline stages, including the fault injection testing stage 618. The audit records may provide a complete history of the results obtained (if any) at the various stages of the pipeline, and may be usable to track any changes made to the original collection of source code before the final executable version of the application is built. By incorporating FIS-orchestrated fault injection as part of a standard methodology for software application development, the CI/CD service and the FIS may simplify the client's task with respect to enhancing the robustness of applications considerably. Because the client may already be responsible for specifying the other pipeline stages, very little additional work may be required to include the fault injection stage 618 into the pipeline, and to acquire/allocate resources used for the fault injection stage 618.

Example Client-Customized Variation in Fault Injection Rates

Figure 7:
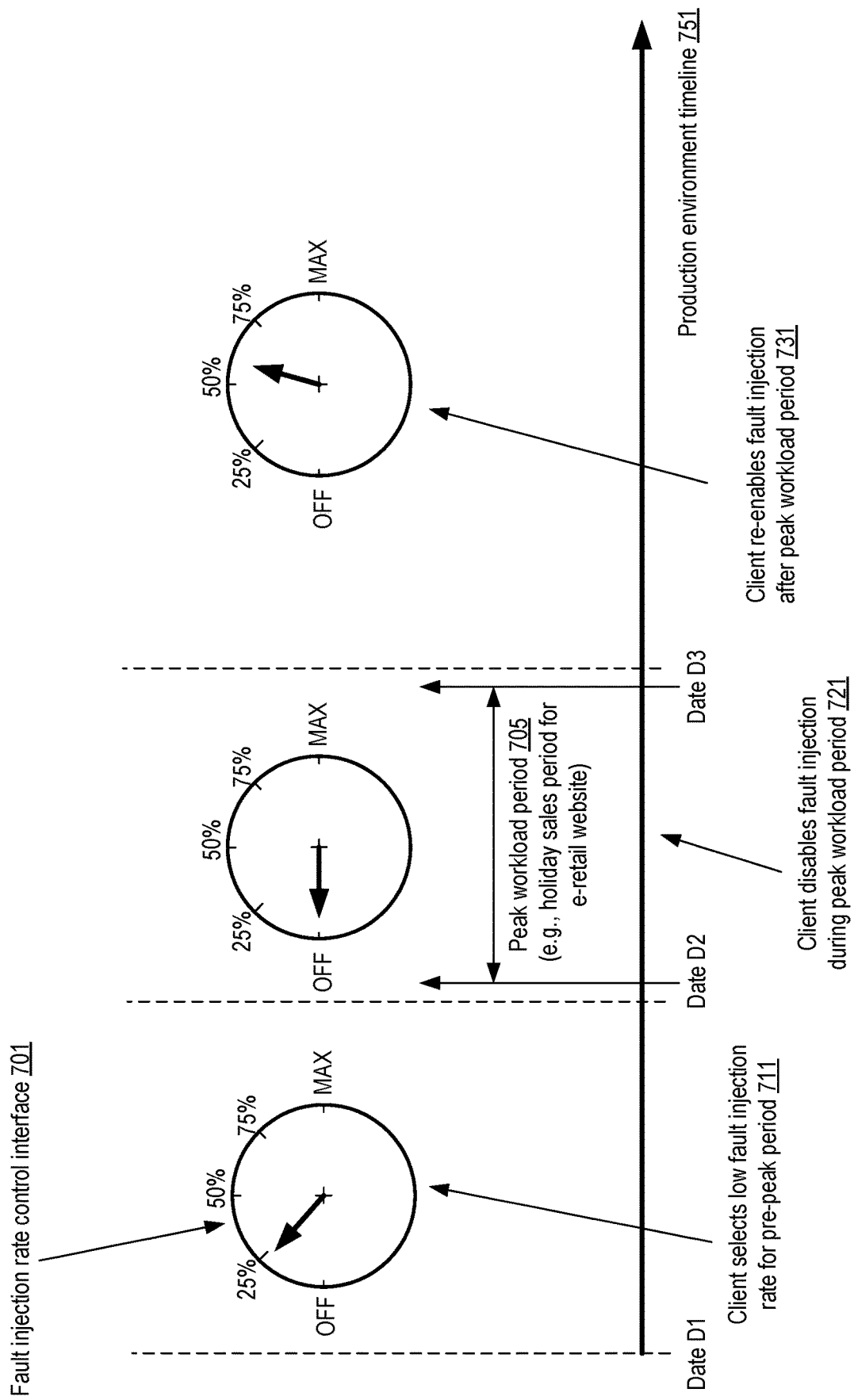
FIG. 7 illustrates an example client-requested variation in fault injection rates over time, according to at least some embodiments.

A number of control interfaces regarding various aspects of fault injection may be supported by a fault injection service in some embodiments. FIG. 7 illustrates an example client-requested variation in fault injection rates over time, according to at least some embodiments. In the depicted embodiment, a client has decided to use an FIS (similar in functionality and features to FIS 150 of FIG. 1) to introduce faults into a production environment. Such a production environment may, for example, be used for hosting one or more websites of an e-retailer, and it may be possible to predict seasonal variations in the workload to which the production environment is subjected.

The client may determine that a peak workload period for the application(s) being run at the production environment is going to start at a data D2, and end at a date D3, along timeline 751 in the example scenario depicted in FIG. 7. The programmatic interfaces implemented by the FIS for fault injection management may include the logical equivalent of a graphical fault injection rate control interface 701 in the depicted embodiment. Such a control interface may be used, for example, to change the number of faults introduced per time unit at the production environment, while other interfaces may be used to specify the specific kinds of faults that are introduced.

In view of the anticipated peak workload period between D2 and D3, the client may disable fault injection entirely (as indicated by label 721) shortly before D2 using control 701, and re-enable fault injection shortly after date D3. Furthermore, from a possible rate range of 0 (OFF) to a maximum (100%), where the definition of the maximum rate may be determined by the MIS in some embodiments, control 701 may be used to apply any desired level of fault injection during various other periods along timeline 751. In the depicted embodiment, a rate of slightly below 25% of the maximum is used between date D1 and D2 (as indicated by label 711), and then a rate above 50% of the maximum is used after D3 (as indicated by label 731). In some embodiments, the client may submit a programmatic request to define the maximum rate. In at least one embodiment, a client may specify a schedule in advance for changing the rate of fault injection, e.g., instead of specifying the new rate every time a change is desired. For example, a client may specify a schedule logically similar to the following: "Date D1: start injecting faults at rate R1; Date D2-delta1: disable faults; Date D3+delta2: re-enable faults at rate R2". Note that the specific analog dial-like implementation of the rate control interface illustrated in FIG. 7 is chosen simply to illustrate the concept of client-specified rate control interfaces, and is not intended to be restrictive; other types of interfaces may be implemented in different embodiments.

In at least one embodiment, a client may use a programmatic interface (similar to that shown in FIG. 7) to request that the rate of fault injection at a target environment be increased gradually until an application fails, with the exact definition of application "failure" being selected by the client. This approach may be referred to as "test to breaking". In effect, using such an interface, a client may request the FIS not just to test the ability of an application to withstand faults, but to push the application with higher and higher levels of faults until it fails, and to report the level of faults required for such a failure.

In at least one embodiment, instead of simply increasing the rate at which faults are injected, a client may be provided interfaces to change the severity (and, if desired, also the rate) of faults injected into a target environment. Thus, for example, for at least some fault categories included in the catalog generated for clients by an FIS, a "severity" attribute may be provided. Such a severity attribute may, for example, be represented as a number between 1 and 100, with 1 representing a relatively low probability of causing a failure at an application, and 100 representing a high probability. The severity levels may be assigned to the fault categories in some embodiments using machine learning or other analytics tools of the FIS, which may use information (in the examined data sources such as those discussed in the context of FIG. 2) about how long it typically took to remediate a given fault (or whether it was even possible to remediate a fault) to assign the severity levels.

Example Programmatic Interactions

Figure 8:
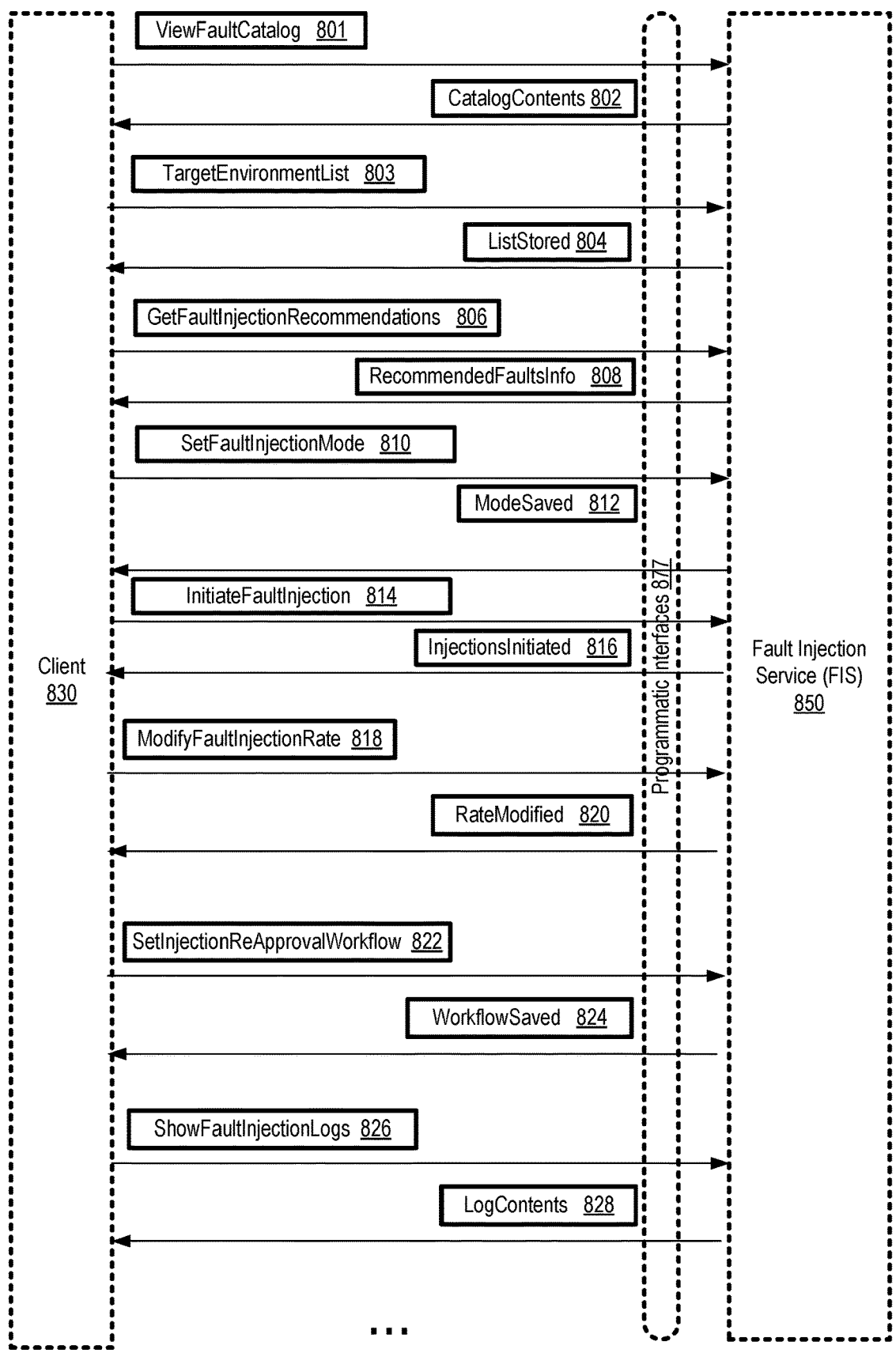
FIG. 8 illustrates example programmatic interactions between clients and a fault injection service, according to at least some embodiments.

FIG. 8 illustrates example programmatic interactions between clients and a fault injection service, according to at least some embodiments. Fault injection service (FIS) 850, similar in functionality and features to FIS 150 of FIG. 1, may implement a set of programmatic interfaces 877 in the depicted embodiment, enabling clients 830 to submit various types of requests and receive corresponding responses. The programmatic interfaces 877 may include, for example, one or more web-based consoles, command-line tools, application programming interfaces (APIs), graphical user interfaces, and the like.

In some embodiments, the client 830 may submit a ViewFaultCatalog request 801 via interfaces 877 to obtain descriptions of the kinds of faults that the FIS is capable of introducing. As mentioned earlier, the FIS may generate, and continuously improve over time, a catalog comprising a collection of fault descriptors which indicate the kinds of events that can be injected into resources being used for the client's applications. In some embodiments, the ViewFaultCatalog request may include parameters indicating the provider network services that are used for the client's applications, potential target execution environments into which the faults are to be injected, and/or other details about the client's applications (e.g., whether a software development or deployment service of the provider network is being used for the application, the problem domains being addresses by the applications, and so on). In response, a CatalogContents response 802 may be transmitted to the clients via the programmatic interfaces 877, indicating the most relevant (or all) of the faults available for injection. In some embodiments, based on the information provided by the client, and/or based on an analysis of the set of resources allocated at various services to the client, a subset of the overall catalog which is likely to be most useful may be presented or made accessible to the client 830. In one embodiment, the latest version of the entire fault category catalog of the FIS may be made available online for potential FIS clients to view, and the ViewFaultCatalog request may simply comprise an HTTP (HyperText Transfer Protocol) request to a web page providing access to the catalog.

A TargetEnvironmentList message 803 may be sent by a client 830 to the FIS 850 in some embodiments, indicating one or more environments (e.g., isolated virtual networks, stages of a development/deployment pipeline, collections of compute instances or other resources) at which the client is going to request the injection of faults. In one embodiment a provider network may implement a software container service, and the target environment may include one or more software containers set up for a client. In another embodiment a client may specify a set of functions to be executed using a server-less dynamic-provisioning service, in which compute resources do not have to be allocated in advance to the client, and the dynamic-provisioning service chooses platforms at which the functions are run, and an FIS client may indicate the set of functions as a target environment for fault injection. In such a scenario, faults may be injected into the resources selected by the clients for executing the client-specified functions. The list of environments indicated by a client may be stored in a metadata repository of the FIS 850 in some embodiments, and a ListStored message 804 may be sent back to the client. In at least one embodiment, the FIS may verify whether the resources of the target environment already have FIS components (e.g., fault injection agents or FIAs) associated with them, or whether new instances of such components need to be configured at the specified target environments. Depending on the analysis of the target environment list by the FIS, one or more new FIAs may be established in response to the TargetEnvironmentList message in such an embodiment.

In at least one embodiment, in response to programmatic requests from clients, faults may also be injected with the help of an FIS 850 at a wide variety of device types which may differ from conventional computer systems such as servers, desktops, laptops and the like. For example, in response to one or more programmatic requests, the FIS 850 may cause faults to be injected at small-footprint devices such as voice-driven personal assistant devices, sensor devices (e.g., smart thermostats, lighting controllers, etc.), smart home appliances, robots, drones, autonomous or semi-autonomous vehicles, wearable computing devices. Such devices may be referred to collectively as "Internet of Things" (IoT) devices. Some types of IoT devices may be configured with built-in FIAs in some embodiments, e.g., as part of their respective embedded operating systems, light-weight run-time environments, or other device components. In one embodiment, corresponding to a group of one or more IoT devices, an external FIA may be configured by an FIS. In at least some embodiments, a TargetEnvironmentList message 803 may indicate a set of such IoT devices at which faults are to be introduced by the FIS. In at least some embodiments, a provider network may be used to develop, deploy and/or manage fleets of such IoT devices, and as a result data sources (similar to data sources discussed in the context of FIG. 2) regarding faults identified at such devices may be analyzed at the FIS to generate fault categories applicable to the IoT devices. In some embodiments, a target environment at which an FIS injects faults may include resources of a different provider network—e.g., an FIS running at one cloud computing environment may coordinate fault injection at resources at a cloud computing environment offered by a different provider.

In some cases, e.g., based on accumulated experience with applications of provider network clients over the years, the FIS 850 may be able to provide recommendations for at least some types of faults that can be injected into the client's application execution environments. A client may submit a GetFaultInjectionRecommendations request 806 in the depicted embodiment to obtain such recommendations. The corresponding RecommendedFaultsInfo response message 808 may include, for example, descriptors of one or more categories of faults that may be useful to test the resilience of the client's application in a specified target environment, indications of whether the FIS recommends randomized or deterministic selection and scheduling of instances of such faults, and so on.

According to one embodiment, a client may specify a fault injection mode for a target environment via a SetFaultInjectionMode request 810. The FIS may store an indication of the fault injection mode in its metadata repositories, and send a ModeSaved response message 812. The fault injection mode, which may be used to indicate the specific types of faults that will be injected, as well as the timing or scheduling of the injections, may be selected from a set which includes at least a randomized mode and a non-randomized mode in some embodiments. In one randomized mode, for example, from a given collection of fault categories that can be injected into a target environment, a particular fault category may be selected at random, and then an instance or example of that fault category may be introduced at one or more targeted resources of that environment after a randomly-selected time interval in some range. In another randomized mode, the fault categories may be selected in advance by the client, but individual faults may be introduced after random intervals. In a different randomized mode, from among a plurality of similar target resources with the target environment (e.g., a group of compute instances of an IVN), a subset may be selected at random for the next round of fault injection. Thus, there may be several dimensions of fault injection operations for which random approaches may be used: the particular types of faults, the target resources, the timing of the faults, and so on. Note that at least in some embodiments, the introduction of one type of fault may sometimes constrain the possible faults that can be introduced next—e.g., if the contents of a packet are modified such that the packet is sent from a source S1 to a destination D1 instead of destination D2 in a fault instance F1, it may not be possible to modify response packets from D2 to S1 in a subsequent fault instance F2 (since D2 may not be in a position to send any response packets to S1).

In one example of deterministic or non-randomized fault injection mode indicated in a SetFaultInjectionMode message 810, client 830 may specify details such as the types of faults to be introduced, the order in which the faults are to be introduced, the specific targeted resources for each fault instance, the timing of the fault introductions, and so on. In some embodiments, the FIS may support easy-to-use graphical interfaces to specify non-randomized fault injections sequences, e.g., providing timelines along which specific fault injections can be positioned, icons for the target resources and fault types, and so on. In various embodiments, a programming language, scripting language or markup language (e.g., Javascript Object Notation or JSON, Extensible Markup Language or XML, etc.) may be used to specify a set of faults to be introduced in a non-random fault injection mode. In at least one embodiment, a client may first request that a random mode be used to inject faults into a target environment, and that the details (fault types, timings, target resources, etc.) of the actual faults injected during the random mode operations be recorded. The client may then be provided by a representation or recording of the actual faults that were introduced, and if desired, that same sequence (or a modified version generated by the client) may be re-played at the same target environment or a different target environment. Clients may modify an existing fault injection mode for a target environment in at least some embodiments using a SetFaultInjectionMode request. In one embodiment, a combination of modes (e.g., some faults being injected at random, and other as part of a pre-selected deterministic regression test) may be used for fault injection at a target environment.

A client 830 may submit an InitiateFaultInjection request 814 to cause the FIS to begin introducing faults at a target environment in the depicted embodiment. After the injections are begun, in some embodiments an InjectionsInitiated message 816 may be sent back to the client. In some embodiments, a duration for which faults are to be injected, the fault injection mode and/or the target environment may be indicated as parameters of the InitiateFaultInjection request. In at least some embodiments, as discussed in the context of FIG. 7, a client 830 may modify the rate at which faults are injected (e.g., by specifying inter-fault intervals or interval ranges) into a target environment by submitting a ModifyFaultInjectionRate request 818. The FIS may change the rate at which faults are injected, and transmit a Rate-Modified response 820. In at least one embodiment, a client may submit a request for several different planned changes in fault injection rates instead of requesting one change at a time. Note that injection rate modifications may be applied to either random-mode fault injection sequences or non-random-mode fault injection sequences in at least some embodiments. For example, if a client had earlier specified the specific intervals between fault injections in a non-random sequence, an expansion or contraction factor may be specified to change the injection rate via a ModifyFaultInjectionRate request. Thus, in one example scenario, a client 830 may specify that all the inter-fault injection intervals be multiplied by a factor of 0.8 (to increase the rate) or by a factor of 1.2 (to decrease the rate).

In some embodiments, a client 830 may specify a workflow to be implemented between one set of one or more fault injection operations and another set of one or more fault injection operations. Consider a scenario in which faults are being injected into a production environment of an application at the request of an FIS client 830. After a particular fault is introduced into the production environment, the client may wish to evaluate the state of the production environment (e.g., to verify that at least some pathways for satisfying application client requests remain operational) before another fault is introduced. To handle these kinds of requirements, a SetInjectionReApprovalWorkflow request 822 may be submitted, in which the client 830 indicates that before scheduling additional faults of a set of faults after a particular fault of the set, one or more conditions have to be verified or one or more actions of a resumption approval workflow have to be taken by the FIS. Such actions may include, for example, obtaining a programmatic approval from a specified authorized entity to resume fault injection. Until such an approval indicator is obtained after a particular fault has been introduced, the FIS may defer injection of an additional fault. Such workflows may represent a safety mechanism that prevents runaway sequences of faults (or combinations of faults whose remediation may take longer than desired) from being introduced in to certain types of target environments.

In various embodiments, the FIS may generate log records indicating the specific faults that are injected on behalf of a client into a target environment. A client may request to view such logs by submitting a ShowFaultInjectionLogs request 826 in at least some embodiments, and the requested information may be provided via one or more LogContents messages 828 by the FIS. A different combination of programmatic request types than that shown in FIG. 8 may be supported at an FIS in at least some embodiments.

Methods for Configuring and Using a Fault Injection Service

Figure 9:
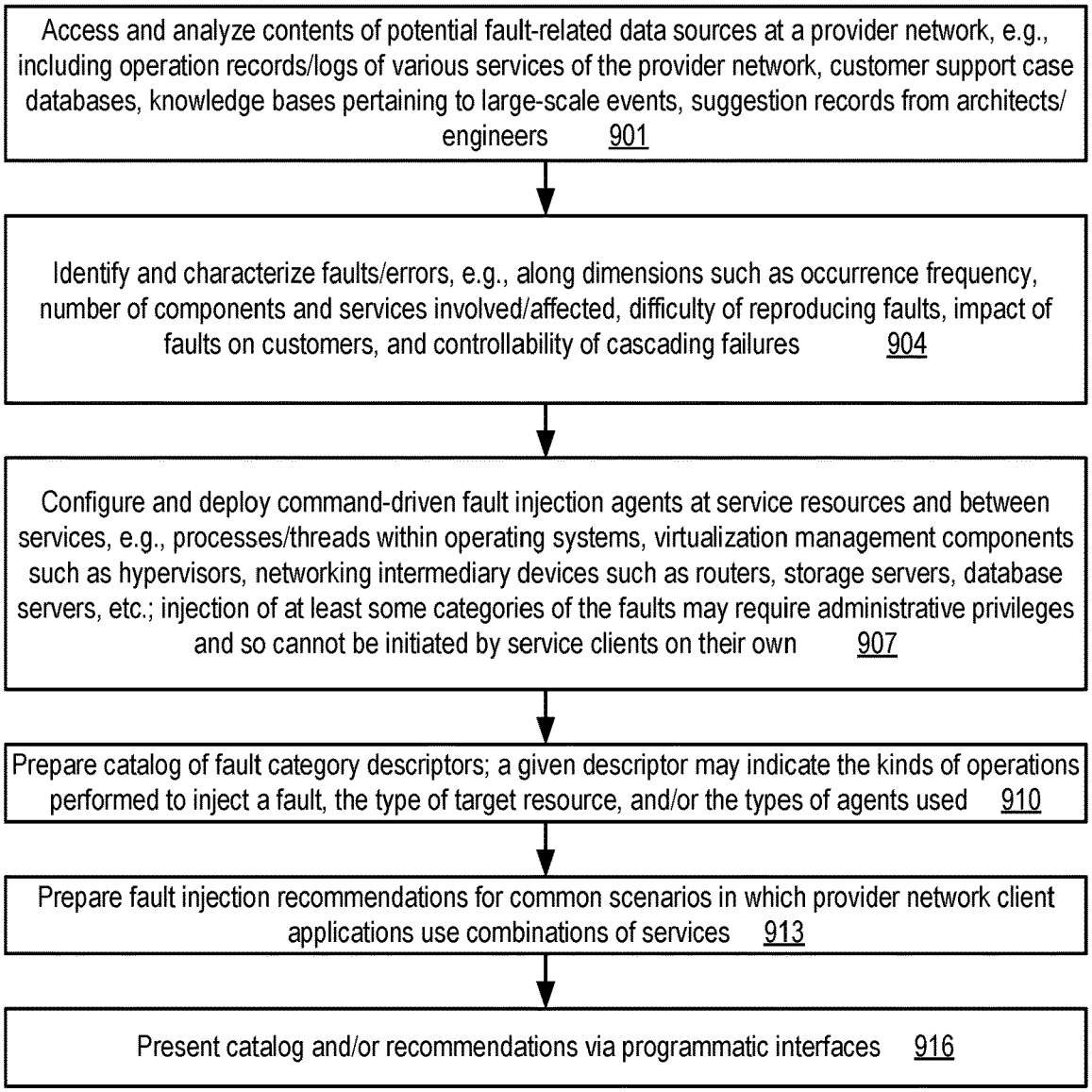
FIG. 9 is a flow diagram illustrating aspects of operations that may be performed at to prepare a catalog and recommendations for fault injection, according to at least some embodiments.

FIG. 9 is a flow diagram illustrating aspects of operations that may be performed at to prepare a catalog and recommendations for fault injection, according to at least some embodiments. As shown in element 901, contents of potential fault-related data sources at a provider network may be analyzed at a fault injection service (FIS) similar to FIS 150 of FIG. 1 in features and functionality. Such data sources may include operation records/logs of various services of the provider network, customer support case databases, knowledge bases pertaining to large-scale events, fault suggestions received from architects/engineers or clients of the provider network, and so on in the depicted embodiment.

A number of events that represent faults/errors (either single events, or combinations of events) may be identified and characterized (element 904), e.g., at resources such as catalog managers of the FIS. In one embodiment, some of the events may already have been labeled as errors in the records being examined (e.g., in customer support logs), so the FIS may extract such events based on their labels. The dimensions along which the faults may be characterized may include, for example, occurrence frequency, number of components and services involved/affected, difficulty of reproducing the faults, estimated impact of faults on customer applications (e.g., whether the fault reduces performance, causes a few minor errors, or shuts down the application entirely), and/or controllability of cascading failures (e.g., how easy it is to stop additional errors from occurring after a given error occurs).

According to some embodiments, at least some command-driven fault injection agents (FIAs) may be configured and/or deployed at and/or along pathways between the provider network services (element 907). In one embodiment, a given FIA may remain dormant or passive by default, thus introducing very little overhead at the services; in response to respective commands from components of the FIS such as the run-time injection coordinators 153 discussed in the context of FIG. 1, the FIA may begin introducing faults and/or stop introducing faults. In some embodiments, FIAs may comprise processes/threads within operating systems of compute instances or non-virtualized servers, virtualization management components such as hypervisors, networking intermediary devices such as routers, storage servers, database servers, etc. In at least some embodiments, one or more hardware FIAs may be configured, e.g., to introduce variations in voltage or current along or at some types of devices or links being used at the services. Note that injection of at least some categories of the faults may require administrative privileges, and so it may not be possible for service clients to inject such faults on their own, i.e., by using the client-facing programmatic interfaces implemented by the services.

Based on the information collected from the data sources and the analysis performed on such information, a catalog of fault category descriptors may be prepared in the depicted embodiment (element 910). A given descriptor may for example indicate the specific kinds of operations that would be performed to inject a fault, the target resource type at which the operations would be performed or directed (e.g., compute instance, router, storage device, a private endpoint set up to access a service from an IVN, etc.), and/or the types of FIAs used for the fault injection. Other properties of the faults may also be included in the descriptors in some embodiments, such as the approximate frequencies of occurrence in production environments, the approximate time taken to respond to such faults in production environments, and so on.

According to some embodiments, a set of fault injection recommendations may be prepared (element 913), e.g., for common scenarios (based on the knowledge accumulated at the provider network) in which client applications use various combinations of one or more provider network services. The catalog and/or recommendations may be presented or provided to clients via programmatic interfaces in at least some embodiments (element 916), enabling clients to make informed decisions regarding the specific types of faults they wish to introduce in target environments. The clients may, if desired, use the information presented by the FIS to issue requests for injecting selected types of faults in various embodiments.

Figure 10:
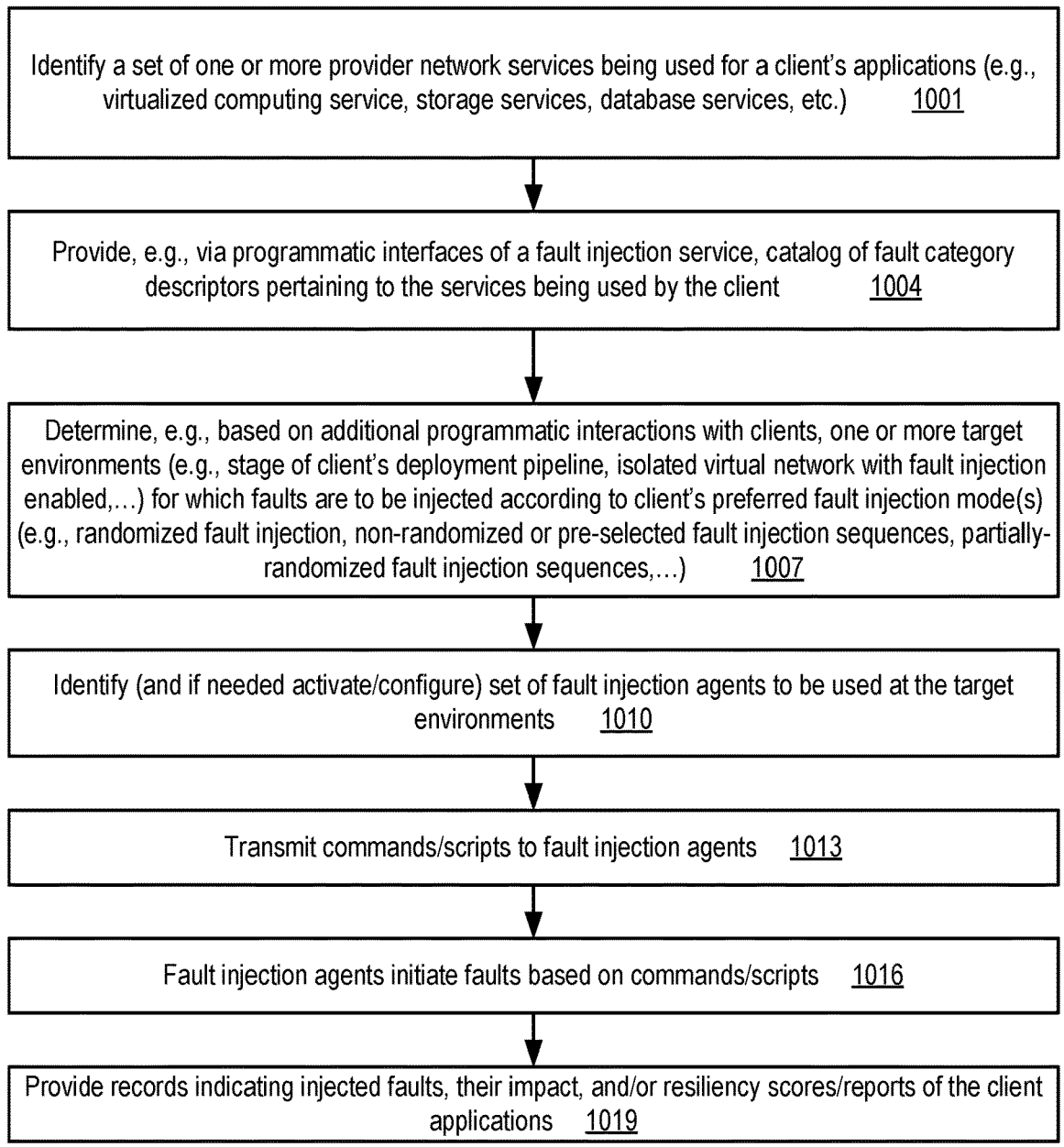
FIG. 10 is a flow diagram illustrating aspects of operations that may be performed in response to client requests submitted to a fault injection service of a provider network, according to at least some embodiments.

FIG. 10 is a flow diagram illustrating aspects of operations that may be performed in response to client requests submitted to a fault injection service of a provider network, according to at least some embodiments. As shown in element 1001, a set of one or more provider network services being used for a client's applications (e.g., a virtualized computing service, one or more storage services, database services, etc.) may be identified at a fault injection service (FIS) similar in features and functionality to FIS 150 of FIG. 1. In some embodiments the client may provide a list of the services programmatically to the FIS, while in other embodiments the FIS may be able to identify the services used on a client's behalf based on queries directed to various services of the provider network.

A set of fault category descriptors (e.g., a portion of a catalog of the kind discussed earlier) pertaining to the services being used by the client may be provided to the client via programmatic interfaces of the FIS (element 1004) in some embodiments. The FIS may determine, e.g., based on one or more additional programmatic interactions, one or more target environments for which faults are to be injected according to client's preferred fault injection mode(s) (element 1007). Any of a wide variety of application execution or testing environments may be targeted for fault injection in different embodiments, such as a specified stage of a client's application testing/deployment pipeline, one or more isolated virtual networks (IVNs) with fault injection enabled, client-premise networks, and so on. The fault injection mode may be selected by the client from a set comprising at least one randomized mode and one non-randomized or pre-selected mode in some embodiments. According to at least one embodiment, a partially-randomized mode may also be selectable for fault injection. As suggested by its name, this third mode may represent a hybrid between fully random fault injection and fully deterministic fault injection. For example, a deterministic sequence of faults may be selected as a baseline for fault injection via a partially-randomized mode, and then random fluctuations or variations (e.g., in the timing or rates of a subset of injected faults for a portion of the baseline sequence, or in the kinds of faults injected during a given part of the baseline sequence) may be introduced to modify the baseline. One example of a partially randomized fault injection sequence may include subjecting a target resource to multiple short bursts of work requests, with the timing of the individual bursts representing a variation around a baseline schedule, and/or the size of the bursts representing a variation around a baseline burst size. The key idea underlying the partially-randomized mode is that certain kinds of fault sequence variations may have been found, e.g., based on analysis of fault-related data sources by an FIS, to be more likely to cause application problems than purely random or purely sequential faults. By retaining some elements of randomness, the targeted resources may eventually be made resilient in a more general way, or to a wider array of possible events, than if pure sequential patterns of faults were used. As a result, such partially-randomized modes may be very helpful in enhancing the robustness of some types of applications. A partially-randomized mode may also be referred to as "weighted random" mode or a "semi-random" mode in various embodiments. In at least some embodiments, when specifying the target environments and/or the fault injection mode, a client may also indicate a time period for which the faults are to be injected.

The FIS may identify (and if needed activate/configure) a set of fault injection agents (FIAs) to be used to introduce the desired set of faults at the target environment(s) (element 1010), and transmit commands/scripts to the FIAs (element 1013) in the depicted embodiment. Based at least in part on the commands/scripts, the FIAs may initiate the injection of faults into the target environments (element 1016). In some embodiments, after a client-specified time period has expired, fault injection may be terminated (and in some cases, the FIAs that were being used may be terminated or decommissioned). Records indicating the injected faults, their impact on client applications, and/or overall resiliency scores or reports may be generated at the FIS and presented to the clients programmatically in at least some embodiments (element 1019).

It is noted that in various embodiments, some of the operations shown in FIG. FIG. 9 and/or FIG. 10 may be implemented in a different order than that shown in the figure, or may be performed in parallel rather than sequentially. Additionally, some of the operations shown in FIG. 9 and/or FIG. 10 may not be required in one or more implementations.

Use Cases

The techniques described above, of utilizing a fault injection service to test the resilience of applications implemented using provider network resources may be extremely beneficial in a number of scenarios. Many organizations rely on using provider network services, such as a virtualized computing service, storage and database services, and so on, for implementing mission-critical applications of the organizations. The provider network may provide infrastructure with very high levels of availability and reliability, and clients may typically not have to be concerned about details of the hardware, software and networking configurations being used for their applications. Because some of the underlying resources and network pathways used for the applications may not be directly accessible to the clients of the provider network, it may be difficult for the clients to come up with comprehensive tests that can be used to thoroughly evaluate the ability of the applications to withstand unexpected events. By developing a comprehensive and continually improving catalog of possible faults that may be encountered by applications that rely on provider network services, a fault injection service may enable clients to test their applications much more thoroughly than would otherwise be possible. By allowing clients to dynamically tune parameters such as the frequency of fault injection, the types of faults inserted, and the specific set of resources at which faults are to be injected, the FIS may allow unprecedented levels of testing customization. Using advanced analytics tools, the FIS may be able to identify and inject subtle combinations of faults that span multiple services, which may help increase the robustness of client applications substantially.

Illustrative Computer System

Figure 11:
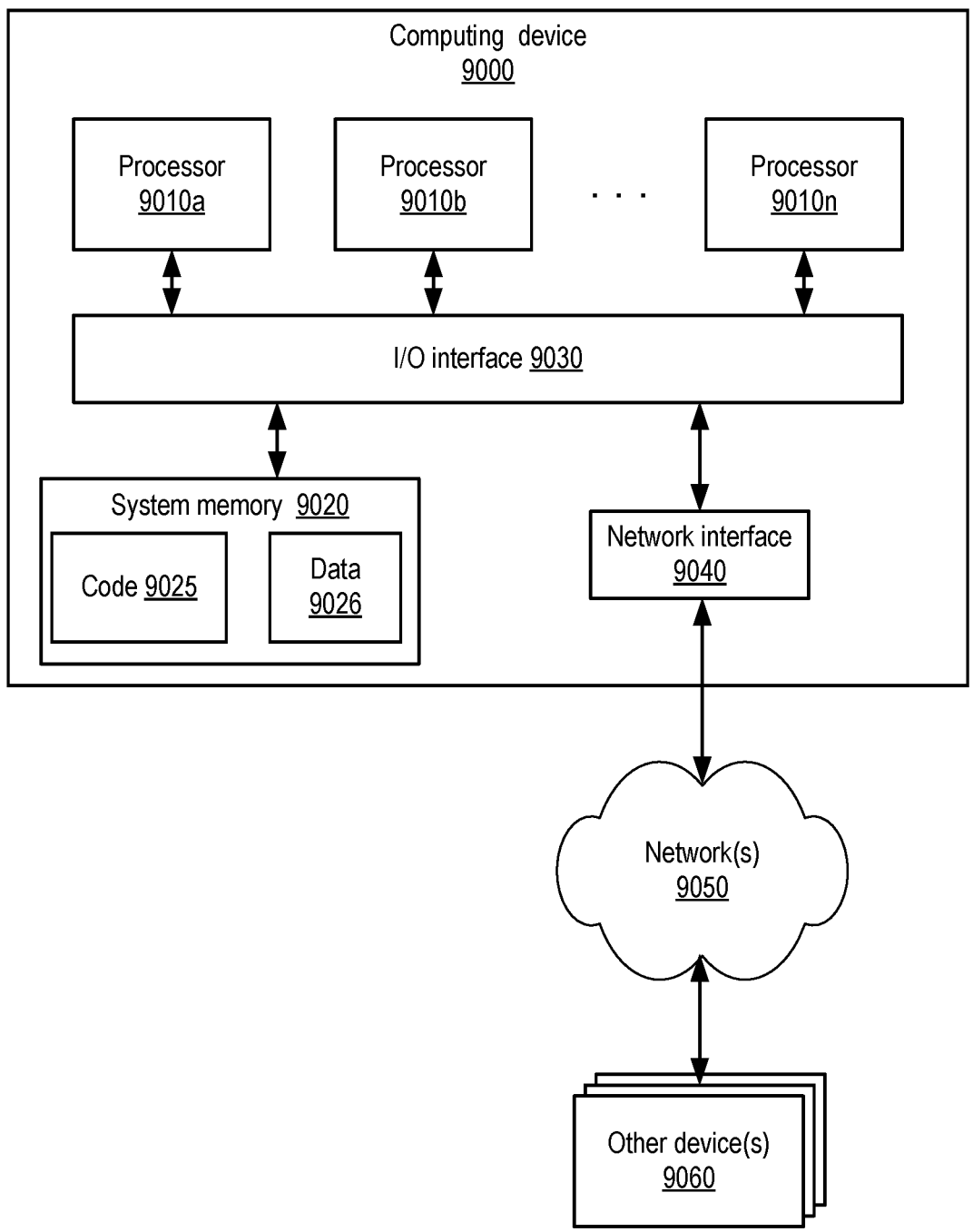
FIG. 11 is a block diagram illustrating an example computing device that may be used in at least some embodiments.

In at least some embodiments, a server that implements a portion or all of one or more of the technologies described herein, including the techniques for various elements of a fault injection service as well as other provider network services may include a general-purpose computer system that includes or is configured to access one or more computer-accessible media. FIG. 11 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 8, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 10 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices;
wherein the one or more computing devices include instructions that upon execution on or across one or more processors cause the one or more computing devices to:
generate, based at least in part on analysis of operation records of one or more services of a provider network, at least a portion of a catalog of fault categories, wherein the catalog includes (a) a first fault category associated with an internal resource of a first service of the one or more services, wherein client-facing interfaces of the first service cannot be used to inject a fault at the internal resource, and (b) a second fault category indicative of a correlated fault associated with a plurality of resources of the one or more services including the first service;
present, via one or more programmatic interfaces of a fault injection service, the catalog to a client;
obtain an indication, from the client via the one or more programmatic interfaces, of (a) a target environment associated with a first application of the client, wherein the first application utilizes at least the first service, and (b) a fault injection mode, wherein the fault injection mode is selected from a set which comprises at least a non-randomized mode and a randomized mode;
identify a set of fault injection agents for the target environment, including (a) a first fault injection agent configured to generate faults of the first fault category, and (b) one or more other fault injection agents configured to generate faults of the second fault category;
cause the first fault injection agent and the one or more other fault injection agents to introduce, in accordance with the fault injection mode, respective faults at the target environment; and
provide an indication, via the one or more programmatic interfaces, of the faults injected at the target environment.

2. The system as recited in claim 1, wherein the one or more computing devices include further instructions that upon execution on or across one or more processors further cause the one or more computing devices to:
obtain, via the one or more programmatic interfaces, an indication of a fault injection rate with respect to the target environment, wherein scheduling of at least some faults of the respective faults is based at least in part on the fault injection rate.

3. The system as recited in claim 1, wherein the one or more computing devices include further instructions that upon execution on or across one or more processors further cause the one or more computing devices to:
utilize one or more analytics tools to (a) detect, based at least in part on an examination of the operation records, instances of one or more categories of faults and (b) generate at least some entries of the catalog based at least in part on the detected instances.

4. The system as recited in claim 1, wherein the one or more computing devices include further instructions that upon execution on or across one or more processors further cause the one or more computing devices to:
provide, based at least in part on an analysis of operation records of the target environment, a resiliency report of a first client application to a client, wherein the resiliency report indicates an impact on the first client application of an injection of at least one fault.

5. The system as recited in claim 1, wherein the target environment comprises at least a portion of an isolated virtual network of the provider network, and wherein the set of fault injection agents includes a particular fault injection agent associated with a private endpoint configured at the isolated virtual network, wherein the private endpoint is used to transfer packets between resources of the isolated virtual network and resources outside the isolated virtual network without utilizing network pathways external to the provider network.

6. A method, comprising:
performing, at one or more computing devices:
presenting, via one or more programmatic interfaces of a fault injection service, an indication of at least a portion of a collection of fault categories, wherein the collection includes a first fault category at an internal resource of a first service of a provider network;
obtaining an indication, via the one or more programmatic interfaces, of a fault injection mode to be used to inject faults into a target environment which comprises one or more resources of at least the first service, wherein the fault injection mode is selected from a set which comprises at least a non-randomized mode; and
causing one or more fault injection agents to introduce, in accordance with the fault injection mode, one or more faults at the target environment, including at least one fault of the first fault category.

7. The method as recited in claim 6, further comprising performing, by the one or more computing devices:
providing, via the one or more programmatic interfaces, an indication of a type of fault injection agent developed by a third party entity, wherein the one or more fault injection agents include a fault injection agent of the indicated type.

8. The method as recited in claim 6, further comprising performing, by the one or more computing devices:
causing, in response to one or more programmatic requests, one or more additional faults to be introduced at one or more of: (a) a voice-driven personal assistant device, (b) a wearable computing device, (c) a sensor, (d) a robot, (e) an autonomous or semi-autonomous vehicle, (f) a drone, (g) a home appliance or (h) a resource of another provider network.

9. The method as recited in claim 6, wherein the collection of fault categories includes a correlated fault associated with resources of a plurality of services of the provider network, wherein the correlated fault is identified using one or more analytics tools.

10. The method as recited in claim 6, wherein the collection of fault categories includes at least one category identified based at least in part on input received via a programmatic fault suggestion interface.

11. The method as recited in claim 6, further comprising performing, by the one or more computing devices:
instantiating, in response to one or more requests received via the one or more programmatic interfaces, at least a first fault injection agent of the one or more fault injection agents; and
terminating, after the one or more faults have been introduced, the first fault injection agent.

12. The method as recited in claim 6, wherein a first agent of the one or more fault injection agents comprises one or more of: (a) a process or thread running within a virtualization management layer of a virtualized computing service, (b) a process or thread running at a networking intermediary device of the provider network, (c) a process or thread running at a storage device.

13. The method as recited in claim 12, wherein a first agent of the one or more fault injection agents is configured to injects faults at a private endpoint, wherein the private endpoint enables a resource to be accessed from an isolated virtual network of the provider network without traversing network paths outside the provider network.

14. The method as recited in claim 6, wherein the target environment comprises one or more of: (a) one or more resources of an isolated virtual network established at a virtualized computing service on behalf of a client, (b) one or more computing devices located at a premise external to the provider network, (c) a stage of a software development and deployment pipeline indicated programmatically by a client or (d) a production environment of a client application.

15. The method as recited in claim 6, wherein the set from which the fault injection mode is selected comprises at least a randomized mode, wherein the fault injection mode is the randomized mode, the method further comprising performing, by the one or more computing devices:
storing an indication of a sequence of one or more faults injected at the target environment in accordance with the randomized mode; and
in response to a programmatic replay request, causing the one or more faults to be injected according to the sequence into a specified target environment.

16. One or more non-transitory computer-accessible storage media storing program instructions that when executed on or across one or more processors cause one or more computer systems to:
present, via one or more programmatic interfaces of a fault injection service, an indication of at least a portion of a collection of fault categories, wherein the collection includes a first fault category at an internal resource of a first service of a provider network;
obtain an indication, via the one or more programmatic interfaces, of a fault injection mode to be used to inject faults into a target environment which comprises one or more resources of at least the first service, wherein the fault injection mode is selected from a set which comprises at least a non-randomized mode; and
cause one or more fault injection agents to introduce, in accordance with the fault injection mode, one or more faults at the target environment, including at least one fault of the first fault category.

17. The one or more non-transitory computer-accessible storage media as recited in claim 16, wherein the set which comprises the non-randomized mode also includes a partially-randomized mode, wherein the selected fault injection mode is the partially-randomized mode, and wherein the one or more non-transitory computer-accessible storage media store further program instructions that when executed on or across one or more processors further cause the one or more computer systems to:
cause to be determined, in accordance with the partially-randomized mode, a random variation with respect to a deterministic fault injection sequence, wherein introduction of at least one fault of the one or more faults at the target environment is based on the random variation.

18. The one or more non-transitory computer-accessible storage media as recited in claim 16, storing further program instructions that when executed on or across one or more processors further cause the one or more computer systems to:
obtain an indication of a resumption approval workflow associated with a particular set of faults and a specified environment into which the particular set of faults is to be injected; and
defer, subsequent to causing a first fault of the particular set of faults to be injected into the specified environment, an injection of a second fault of the particular set until an approval indicator has been received in accordance with the resumption approval workflow.

19. The one or more non-transitory computer-accessible storage media as recited in claim 16, storing further program instructions that when executed on or across one or more processors further cause the one or more computer systems to:

provide, via the one or more programmatic interfaces, an indication of a fault recommended for injection into the target environment.

20. The non-transitory computer-accessible storage media as recited in claim 16, storing further program instructions that when executed on or across one or more processors further cause the one or more computer systems to:

include, based at least in part on an analysis of operation records of one or more services of the provider network, a particular fault category in the collection, wherein the particular fault category comprises one of: (a) a packet drop, (b) a packet delay, (c) a packet corruption, (d) an indexing failure, (e) a data plane disconnection, (f) a control plane disconnection, (g) a failure of an autonomous cell of a plurality of cells of a service, (h) a storage device failure, (i) a failure of a resource to which a client-specified tag has been assigned, (j) a route table entry loss, (k) a load balancer failure, (l) a malfunction of a replication algorithm, (m) a loss of access to the Internet or (n) a spike in a request rate.

* * * * *